(12) United States Patent
Fujimori et al.

(10) Patent No.: US 11,673,806 B2
(45) Date of Patent: Jun. 13, 2023

(54) CARBON NANOTUBE COMPOSITE ASSEMBLED WIRE, HEAT-TREATED BODY OF CARBON NANOTUBE COMPOSITE ASSEMBLED WIRE, METHOD FOR MANUFACTURING CARBON NANOTUBE COMPOSITE ASSEMBLED WIRE, AND METHOD FOR MANUFACTURING HEAT-TREATED BODY OF CARBON NANOTUBE COMPOSITE ASSEMBLED WIRE

(71) Applicants: SUMITOMO ELECTRIC INDUSTRIES, LTD., Osaka (JP); UNIVERSITY OF TSUKUBA, Tsukuba (JP)

(72) Inventors: Toshihiko Fujimori, Osaka (JP); Takeshi Hikata, Osaka (JP); Soichiro Okubo, Osaka (JP); Jun-ichi Fujita, Tsukuba (JP)

(73) Assignees: SUMITOMO ELECTRIC INDUSTRIES, LTD., Osaka (JP); UNIVERSITY OF TSUKUBA, Tsukuba (JP)

( * ) Notice: Subject to any disclaimer, the term of this patent is extended or adjusted under 35 U.S.C. 154(b) by 0 days.

(21) Appl. No.: 17/272,785

(22) PCT Filed: Aug. 29, 2019

(86) PCT No.: PCT/JP2019/033995
§ 371 (c)(1),
(2) Date: Mar. 2, 2021

(87) PCT Pub. No.: WO2020/050142
PCT Pub. Date: Mar. 12, 2020

(65) Prior Publication Data
US 2021/0309522 A1 Oct. 7, 2021

(30) Foreign Application Priority Data

Sep. 3, 2018 (JP) .............................. JP2018-164909

(51) Int. Cl.
*C01B 32/168* (2017.01)
*H01B 1/04* (2006.01)
(Continued)

(52) U.S. Cl.
CPC ............ *C01B 32/168* (2017.08); *H01B 1/04* (2013.01); *H01B 13/0016* (2013.01);
(Continued)

(58) Field of Classification Search
CPC ... C01B 32/168; C01B 32/16; Y10S 977/745; C01P 2004/13; C01P 2004/16; C01P 2004/84
See application file for complete search history.

(56) References Cited

U.S. PATENT DOCUMENTS

2005/0100499 A1    5/2005  Oya et al.
2007/0224107 A1    9/2007  Hikata
(Continued)

FOREIGN PATENT DOCUMENTS

CN    105261487 A    1/2016
CN    106935855 A    7/2017
(Continued)

OTHER PUBLICATIONS

Landi, B.J., et al., Thermal Oxidation Profiling of Single-Walled Carbon Nanotubes. Chemistry of Materials, 2005. 17(26): p. 6819-6834. (Year: 2005).*
(Continued)

*Primary Examiner* — Hoa (Holly) Le
(74) *Attorney, Agent, or Firm* — Oliff PLC

(57) ABSTRACT

A carbon nanotube composite assembled wire is a carbon nanotube composite assembled wire including a plurality of
(Continued)

carbon nanotube composites, each of the plurality of carbon nanotube composites including one carbon nanotube and an amorphous carbon-containing layer that coats the carbon nanotube, the carbon nanotube having a D/G ratio of 0.1 or less, the D/G ratio being a ratio of a peak intensity of a D band to a peak intensity of a G band in Raman spectroscopic analysis with a wavelength of 532 nm, each of the plurality of carbon nanotube composites being fibrous and having a diameter of 0.1 μm or more and 50 μm or less, the plurality of carbon nanotube composites being oriented in a longitudinal direction of the carbon nanotube composite assembled wire.

15 Claims, 4 Drawing Sheets

(51) Int. Cl.
  *H01B 13/00* (2006.01)
  *B82Y 30/00* (2011.01)
  *B82Y 40/00* (2011.01)

(52) U.S. Cl.
  CPC ............... *B82Y 30/00* (2013.01); *B82Y 40/00* (2013.01); *C01B 2202/22* (2013.01); *C01B 2202/36* (2013.01); *C01P 2002/82* (2013.01); *C01P 2004/02* (2013.01)

(56) References Cited

U.S. PATENT DOCUMENTS

| | | | | |
|---|---|---|---|---|
| 2008/0063586 A1* | 3/2008 | Oya | ............... | B82Y 40/00 423/445 R |
| 2015/0056447 A1* | 2/2015 | Bai | ............... | C23C 16/4486 427/249.4 |
| 2018/0170757 A1* | 6/2018 | Watanabe | ............... | B82Y 40/00 |
| 2022/0064002 A1* | 3/2022 | Fujimori | ............... | C01B 32/162 |

FOREIGN PATENT DOCUMENTS

| | | | |
|---|---|---|---|
| JP | 2003-146634 A | 5/2003 | |
| JP | 2004-299986 A | 10/2004 | |
| JP | 2005-330175 A | 12/2005 | |
| JP | 2006-213569 A | 8/2006 | |
| JP | 2014-231446 A | 12/2014 | |
| WO | 2007/099975 A1 | 9/2007 | |
| WO | WO-2018143466 A1 * | 8/2018 | ............. B82Y 30/00 |

OTHER PUBLICATIONS

Pham et al., Effect of growth temperature on the synthesis of carbon nanotube arrays and amorphous carbon for thermal applications, Phys. Status Solidi A 214, No. 7, 1600852 (2017) / DOI 10.1002/pssa.201600852 (Year: 2017).*

Yao et al, Epitaxial Welding of Carbon Nanotube Networks for Aqueous Battery Current Collectors, ACS Nano 2018, 12, 5266-5273 (Year: 2018).*

* cited by examiner

CARBON NANOTUBE COMPOSITE ASSEMBLED WIRE, HEAT-TREATED BODY OF CARBON NANOTUBE COMPOSITE ASSEMBLED WIRE, METHOD FOR MANUFACTURING CARBON NANOTUBE COMPOSITE ASSEMBLED WIRE, AND METHOD FOR MANUFACTURING HEAT-TREATED BODY OF CARBON NANOTUBE COMPOSITE ASSEMBLED WIRE

TECHNICAL FIELD

The present disclosure relates to a carbon nanotube composite assembled wire, a heat-treated body of a carbon nanotube composite assembled wire, a method for manufacturing a carbon nanotube composite assembled wire, and a method for manufacturing a heat-treated body of a carbon nanotube composite assembled wire. The present application claims priority to Japanese Patent Application No. 2018-164909 filed on Sep. 3, 2018, the entire contents of which are incorporated herein by reference.

BACKGROUND ART

A carbon nanotube composed of a cylindrical sheet made of carbon atoms bonded in a hexagonal pattern is a material having excellent characteristics, such as a weight that is one fifth of that of copper, a strength that is 20 times that of steel, and a metal-like electrical conductivity. Thus, an electric wire using the carbon nanotube is expected as a material contributing to decreased weight and size and improved corrosion resistance of motors for cars in particular.

The carbon nanotube is obtained, for example, by a vapor phase growth method of supplying a source gas containing carbon while heating a fine catalyst such as iron to grow carbon nanotubes from the catalyst, as described in PTL 1 (Japanese Patent Laying-Open No. 2005-330175).

CITATION LIST

Patent Literature

PTL 1: Japanese Patent Laying-Open No. 2005-330175

SUMMARY OF INVENTION

[1] A carbon nanotube composite assembled wire in accordance with one aspect of the present disclosure is a carbon nanotube composite assembled wire including a plurality of carbon nanotube composites, each of the plurality of carbon nanotube composites including one carbon nanotube and an amorphous carbon-containing layer that coats the carbon nanotube, the carbon nanotube having a D/G ratio of 0.1 or less, the D/G ratio being a ratio of a peak intensity of a D band to a peak intensity of a G band in Raman spectroscopic analysis with a wavelength of 532 nm, each of the plurality of carbon nanotube composites being fibrous and having a diameter of 0.1 µm or more and 50 µm or less, the plurality of carbon nanotube composites being oriented in a longitudinal direction of the carbon nanotube composite assembled wire.

[2] A heat-treated body of a carbon nanotube composite assembled wire in accordance with one aspect of the present disclosure is a heat-treated body of the carbon nanotube composite assembled wire in [1] described above.

[3] A method for manufacturing a carbon nanotube composite assembled wire in accordance with one aspect of the present disclosure is a method for manufacturing a carbon nanotube composite assembled wire, the method including:

a first step of preparing a plurality of carbon nanotubes;

a second step of obtaining a plurality of carbon nanotube composites by coating each of the plurality of carbon nanotubes with an amorphous carbon-containing layer; and a third step of obtaining a carbon nanotube composite assembled wire by assembling the plurality of carbon nanotube composites to be oriented in a longitudinal direction thereof.

[4] A method for manufacturing a heat-treated body of a carbon nanotube composite assembled wire in accordance with one aspect of the present disclosure is a method for manufacturing a heat-treated body of a carbon nanotube composite assembled wire, the method including:

a first step of preparing a plurality of carbon nanotubes;

a second step of obtaining a plurality of carbon nanotube composites by coating each of the plurality of carbon nanotubes with an amorphous carbon-containing layer;

a third step of obtaining a carbon nanotube composite assembled wire by assembling the plurality of carbon nanotube composites to be oriented in a longitudinal direction thereof; and a fourth step of obtaining a heat-treated body of the carbon nanotube composite assembled wire by removing the amorphous carbon-containing layer by heat-treating the carbon nanotube composite assembled wire.

DETAILED DESCRIPTION

Figure 1:
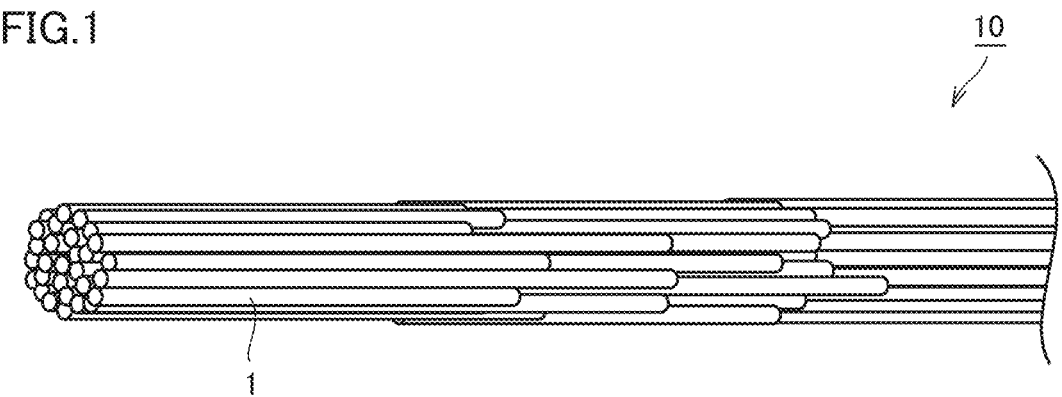
FIG. 1 is a view illustrating a typical exemplary configuration of a carbon nanotube composite assembled wire in accordance with one embodiment of the present disclosure.

Problem to be Solved by the Present Disclosure

Carbon nanotubes obtained by current techniques of fabricating carbon nanotubes have a diameter of about 0.4 nm to 20 nm and a maximum length of about 550 mm. In order to use a carbon nanotube as an electric wire, a longer carbon nanotube is required, and thus techniques capable of lengthening a carbon nanotube have been studied.

As one of the methods of lengthening a carbon nanotube, there is conceivable a method of assembling a plurality of carbon nanotubes to be aligned in a longitudinal direction to obtain an assembled wire.

However, since each carbon nanotube is extremely small with a diameter of about 0.4 nm to 20 nm as described above, the carbon nanotube cannot be observed with an optical microscope. In particular, as the carbon nanotube has a higher crystallinity, the carbon nanotube has a smaller diameter, and handling thereof becomes more difficult. Accordingly, it has been difficult to assemble a plurality of carbon nanotubes to be aligned in a longitudinal direction thereof to obtain an assembled wire.

Accordingly, an object of the present disclosure is to provide a carbon nanotube composite assembled wire, a heat-treated body of a carbon nanotube composite assembled wire, a method for manufacturing a carbon nanotube composite assembled wire, and a method for manufacturing a heat-treated body of a carbon nanotube composite assembled wire capable of obtaining a heat-treated body of a carbon nanotube composite assembled wire including a plurality of high crystallinity carbon nanotubes assembled to be oriented in a longitudinal direction thereof.

Advantageous Effect of the Present Disclosure

According to the aspect described above, it is possible to provide a heat-treated body of a carbon nanotube composite assembled wire including a plurality of high crystallinity carbon nanotubes assembled to be oriented in a longitudinal direction thereof.

DESCRIPTION OF EMBODIMENTS OF THE PRESENT DISCLOSURE

First, aspects of the present disclosure will be described one by one.

(1) A carbon nanotube composite assembled wire in accordance with one aspect of the present disclosure is a carbon nanotube composite assembled wire including a plurality of carbon nanotube composites, each of the plurality of carbon nanotube composites including one carbon nanotube and an amorphous carbon-containing layer that coats the carbon nanotube, the carbon nanotube having a D/G ratio of 0.1 or less, the D/G ratio being a ratio of a peak intensity of a D band to a peak intensity of a G band in Raman spectroscopic analysis with a wavelength of 532 nm, each of the plurality of carbon nanotube composites being fibrous and having a diameter of 0.1 μm or more and 50 μm or less, the plurality of carbon nanotube composites being oriented in a longitudinal direction of the carbon nanotube composite assembled wire.

According to the carbon nanotube composite assembled wire, it is possible to obtain a heat-treated body of the carbon nanotube composite assembled wire including a plurality of high crystallinity carbon nanotubes assembled to be oriented in a longitudinal direction thereof.

(2) Preferably, the amorphous carbon-containing layer has a D/G ratio of 0.5 or more, the D/G ratio being a ratio of a peak intensity of a D band to a peak intensity of a G band in Raman spectroscopic analysis with a wavelength of 532 nm. Thereby, it is possible to remove only the amorphous carbon-containing layer by heat treatment.

(3) A heat-treated body of a carbon nanotube composite assembled wire in accordance with one aspect of the present disclosure is a heat-treated body of the carbon nanotube composite assembled wire described in (1) or (2) described above.

The heat-treated body of the carbon nanotube composite assembled wire is formed to include the plurality of high crystallinity carbon nanotubes assembled to be oriented in the longitudinal direction thereof.

(4) A method for manufacturing a carbon nanotube composite assembled wire in accordance with one aspect of the present disclosure is a method for manufacturing a carbon nanotube composite assembled wire, the method including:

a first step of preparing a plurality of carbon nanotubes;

a second step of obtaining a plurality of carbon nanotube composites by coating each of the plurality of carbon nanotubes with an amorphous carbon-containing layer; and a third step of obtaining a carbon nanotube composite assembled wire by assembling the plurality of carbon nanotube composites to be oriented in a longitudinal direction thereof.

According to the manufacturing method, carbon nanotube composites that are easily handled are fabricated, and the carbon nanotube composites are used to fabricate a carbon nanotube composite assembled wire. Thus, the carbon nanotube composite assembled wire is easily obtained.

(5) Preferably, the carbon nanotube has a D/G ratio of 0.1 or less, the D/G ratio being a ratio of a peak intensity of a D band to a peak intensity of a G band in Raman spectroscopic analysis with a wavelength of 532 nm, and each of the plurality of carbon nanotube composites is fibrous and has a diameter of 0.1 μm or more and 50 μm or less.

Thereby, the carbon nanotube composite assembled wire can include high crystallinity carbon nanotubes, and has an improved handling property.

(6) Preferably, the second step includes heat-treating the plurality of carbon nanotubes at a temperature of 950° C. or more and 1100° C. or less in a hydrocarbon-based gas. Thereby, it is possible to form the amorphous carbon-containing layer having a predetermined D/G ratio on the surface of each carbon nanotube while maintaining the crystallinity of the carbon nanotube.

(7) Preferably, the third step includes a third a step of obtaining a carbon nanotube composite dispersion liquid by dispersing the plurality of carbon nanotube composites in a solvent, a third b step of orienting the plurality of carbon nanotube composites in a specific direction by flowing the carbon nanotube composite dispersion liquid in the specific direction, and a third c step of obtaining the carbon nanotube composite assembled wire by removing the solvent from the carbon nanotube composite dispersion liquid after the third b step.

Thereby, the plurality of carbon nanotube composites can be efficiently assembled to be oriented in the longitudinal direction thereof.

(8) A method for manufacturing a heat-treated body of a carbon nanotube composite assembled wire in accordance with one aspect of the present disclosure is a method for manufacturing a heat-treated body of a carbon nanotube composite assembled wire, the method including:

a first step of preparing a plurality of carbon nanotubes;

a second step of obtaining a plurality of carbon nanotube composites by coating each of the plurality of carbon nanotubes with an amorphous carbon-containing layer;

a third step of obtaining a carbon nanotube composite assembled wire by assembling the plurality of carbon nanotube composites to be oriented in a longitudinal direction thereof; and a fourth step of obtaining a heat-treated body of the carbon nanotube composite assembled wire by removing the amorphous carbon-containing layer by heat-treating the carbon nanotube composite assembled wire.

According to the manufacturing method, carbon nanotube composites that are easily handled are fabricated, the carbon nanotube composites are used to fabricate a carbon nanotube composite assembled wire, and the carbon nanotube composite assembled wire is heat-treated to obtain a heat-treated body of the carbon nanotube composite assembled wire. Thus, the heat-treated body of the carbon nanotube composite assembled wire is easily obtained.

(9) Preferably, the carbon nanotube has a D/G ratio of 0.1 or less, the D/G ratio being a ratio of a peak intensity of a D band to a peak intensity of a G band in Raman spectroscopic analysis with a wavelength of 532 nm, and each of the plurality of carbon nanotube composites is fibrous and has a diameter of 0.1 μm or more and 50 μm or less.

Thereby, the carbon nanotube composite can include a high crystallinity carbon nanotube, and has an improved handling property. Further, the carbon nanotube composite assembled wire can also include high crystallinity carbon nanotubes.

(10) When the carbon nanotube composite assembled wire has a diameter of P1 and the heat-treated body of the carbon nanotube composite assembled wire has a diameter of P2, the P1 and the P2 preferably exhibit a relation indicated by the following expression 1.

$$100 \leq P1/P2 \leq 10000 \quad \text{expression 1}$$

Since the carbon nanotubes are in contact with each other or are bonded in the heat-treated body of the carbon nanotube composite assembled wire, the heat-treated body of the carbon nanotube composite assembled wire has an excellent electrical conductivity.

(11) Preferably, the second step includes heat-treating the plurality of carbon nanotubes at a temperature of 950° C. or more and 1100° C. or less in a hydrocarbon-based gas. Thereby, it is possible to form the amorphous carbon-containing layer having a predetermined D/G ratio on the surface of each carbon nanotube while maintaining the crystallinity of the carbon nanotube.

(12) Preferably, the third step includes a third a step of obtaining a carbon nanotube composite dispersion liquid by dispersing the plurality of carbon nanotube composites in a solvent, a third b step of orienting the plurality of carbon nanotube composites in a specific direction by flowing the carbon nanotube composite dispersion liquid in the specific direction, and a third c step of obtaining the carbon nanotube composite assembled wire by removing the solvent from the carbon nanotube composite dispersion liquid after the third b step.

Thereby, the plurality of carbon nanotube composites can be efficiently assembled to be oriented in the longitudinal direction thereof.

(13) Preferably, heat treatment in the fourth step includes heat-treating the carbon nanotube composite assembled wire at a temperature of 400° C. or more and 800° C. or less under oxidizing conditions.

Thereby, it is possible to remove only the amorphous carbon-containing layers from the carbon nanotube composites while maintaining the crystallinity of the carbon nanotubes.

(14) Preferably, the heat treatment in the fourth step includes heat-treating the carbon nanotube composite assembled wire at a temperature of 560° C. or more and 690° C. or less under the oxidizing conditions.

Thereby, it is possible to remove only the amorphous carbon-containing layers from the carbon nanotube composites while maintaining the crystallinity of the carbon nanotubes.

Details of Embodiments of the Present Disclosure

Specific examples of a carbon nanotube composite assembled wire, a heat-treated body of a carbon nanotube composite assembled wire, a method for manufacturing a carbon nanotube composite assembled wire, and a method for manufacturing a heat-treated body of a carbon nanotube composite assembled wire in accordance with one embodiment of the present disclosure will be described below with reference to the drawings.

In the drawings of the present disclosure, the same reference numerals designate identical or corresponding parts. In addition, dimensional relations in length, width, thickness, depth, and the like are changed as appropriate for clarity and simplicity of the drawings, and do not necessarily represent actual dimensional relations.

First Embodiment: Carbon Nanotube Composite Assembled Wire (Carbon Nanotube Composite Assembled Wire)

Figure 2:
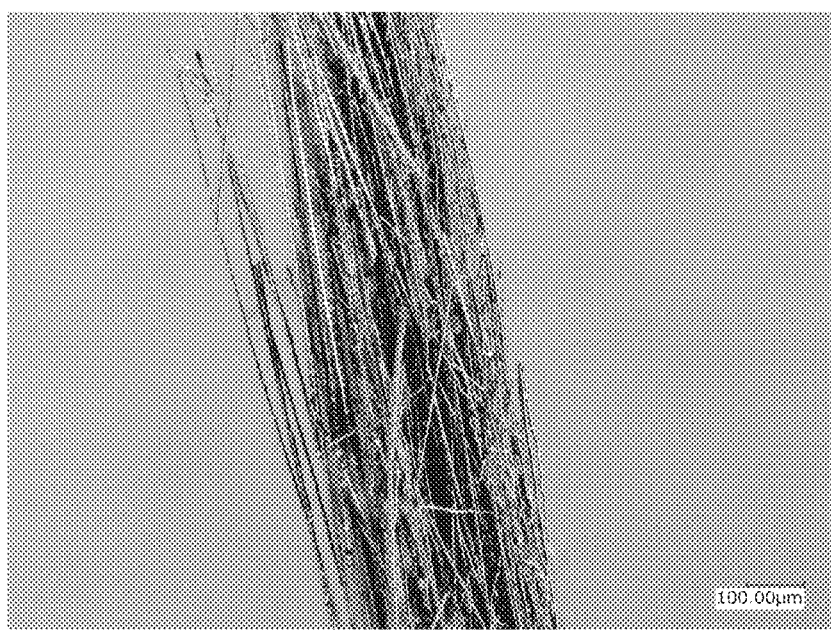
FIG. 2 is an optical micrograph of the carbon nanotube composite assembled wire in accordance with one embodiment of the present disclosure.
Figure 3:
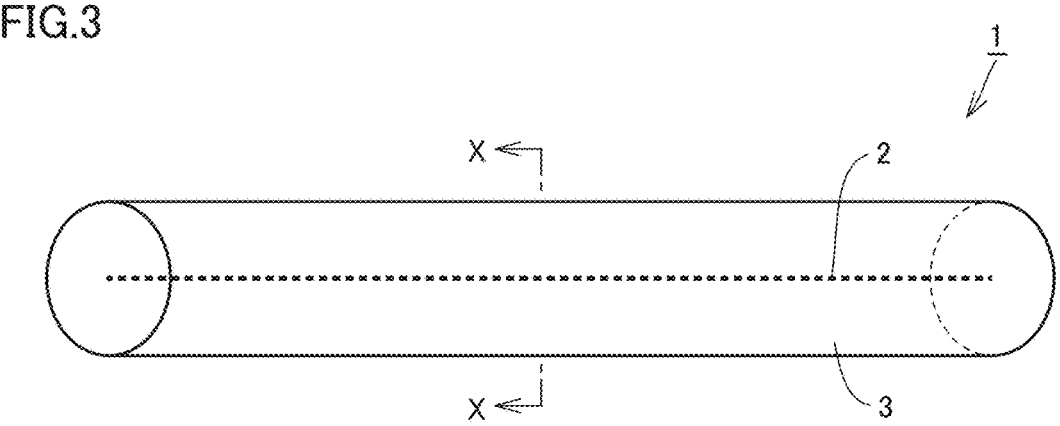
FIG. 3 is a view illustrating a typical exemplary configuration of a carbon nanotube composite used in one embodiment of the present disclosure.
Figure 4:
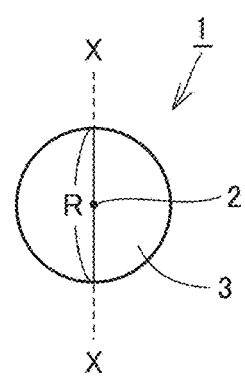
FIG. 4 is a cross sectional view of the carbon nanotube composite of FIG. 3 taken along a line X-X.
Figure 5:
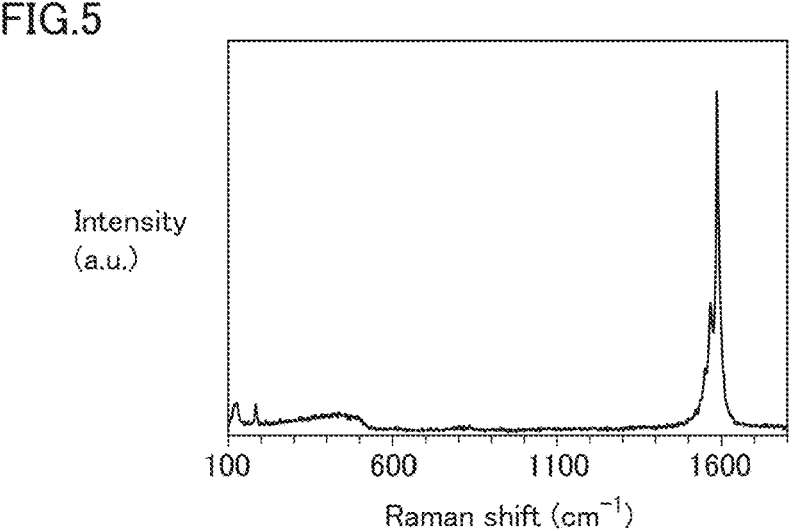
FIG. 5 is a view showing a typical Raman spectrum of a carbon nanotube.

As shown in FIGS. 1 and 2, a carbon nanotube composite assembled wire (hereinafter also referred to as a CNT composite assembled wire) 10 in accordance with the present embodiment includes a plurality of carbon nanotube composites 1 (hereinafter also referred to as CNT composites). As shown in FIGS. 3 and 4, each of the plurality of carbon nanotube composites 1 includes one carbon nanotube 2 and an amorphous carbon-containing layer 3 that coats carbon nanotube 2. Carbon nanotube 2 has a D/G ratio of 0.1 or less, the D/G ratio being a ratio of a peak intensity of a D band to a peak intensity of a G band in Raman spectroscopic analysis with a wavelength of 532 nm. Each of the plurality of carbon nanotube composites 1 is fibrous and has a diameter of 0.1 μm or more and 50 μm or less. The plurality of carbon nanotube composites 1 are oriented in a longitudinal direction of carbon nanotube composite assembled wire 10. With these features, the carbon nanotube composite assembled wire in accordance with the present embodiment can have effects indicated in (1) to (3) described below.

(1) The carbon nanotube composite assembled wire in accordance with the present embodiment includes a plurality of carbon nanotube composites, and the plurality of carbon nanotube composites are oriented in the longitudinal direction of the carbon nanotube composite assembled wire. Here, the expression "the plurality of carbon nanotube composites are oriented in the longitudinal direction of the carbon nanotube composite assembled wire" means that the longitudinal direction of the carbon nanotube composite assembled wire and a longitudinal direction of the carbon nanotube composites extend in substantially the same direction. In other words, the carbon nanotube composite assembled wire is formed by assembling the plurality of carbon nanotube composites to be oriented in the longitudinal direction thereof. It should be noted that the expression "substantially the same direction" means that the maximum angle formed between two different carbon nanotube composites included in the carbon nanotube composite assembled wire is 10° or less.

Each of the plurality of carbon nanotube composites described above includes a high crystallinity carbon nanotube having a D/G ratio of 0.1 or less. Therefore, in the carbon nanotube composite assembled wire in accordance with the present embodiment, a plurality of high crystallinity carbon nanotubes are also oriented in the longitudinal direction of the carbon nanotube composite assembled wire.

The amorphous carbon-containing layer included in each carbon nanotube composite can be removed by performing heat treatment, and thereby, a high crystallinity refined carbon nanotube only can be obtained. In the present specification, a carbon nanotube obtained by removing the amorphous carbon-containing layer from the carbon nanotube composite is also referred to as a refined carbon nanotube.

Therefore, by heat-treating the carbon nanotube composite assembled wire in accordance with the present embodiment, it is possible to obtain a heat-treated body of the carbon nanotube composite assembled wire (hereinafter also referred to as a heat-treated body of the CNT composite assembled wire) which includes a plurality of high crystallinity refined carbon nanotubes and in which the plurality of high crystallinity refined carbon nanotubes are assembled to be oriented in a longitudinal direction thereof.

(2) Since the plurality of high crystallinity refined carbon nanotubes are assembled to be oriented in the longitudinal direction thereof in the heat-treated body of the CNT composite assembled wire as described in (1) described above, the heat-treated body of the CNT composite assembled wire can have a high tensile strength and a high electrical conductivity. Accordingly, with the carbon nanotube composite assembled wire in accordance with the present embodiment, it is possible to obtain a heat-treated body of the CNT composite assembled wire having a high tensile strength and a high electrical conductivity.

(3) Since each of the plurality of carbon nanotube composites used for the carbon nanotube composite assembled wire in accordance with the present embodiment is fibrous and has a diameter of 0.1 μm or more and 50 μm or less, it can be observed with an optical microscope, and is easily handled. Therefore, the carbon nanotube composite assembled wire including the carbon nanotube composites can also be observed with the optical microscope, and is easily handled.

The carbon nanotube composite assembled wire has the shape of a string in which the plurality of fibrous carbon nanotube composites are assembled to be oriented in the longitudinal direction thereof. The expression "the plurality of fibrous carbon nanotube composites are assembled to be oriented in the longitudinal direction thereof" means that the plurality of fibrous carbon nanotube composites are assembled such that the longitudinal direction of each of the plurality of carbon nanotube composites extends in substantially the same direction. It should be noted that the expression "substantially the same direction" means that the maximum angle formed between two different carbon nanotube composites included in the carbon nanotube composite assembled wire is 10° or less.

The overall external appearance of the carbon nanotube composite assembled wire is not particularly limited, and can be any external appearance according to the purpose. For example, it can be a linear shape or a curved shape.

The length of the carbon nanotube composite assembled wire is not particularly limited, and can be adjusted as appropriate depending on the purpose. The length of the CNT composite assembled wire is preferably 10 μm or more, more preferably 100 μm or more, and further preferably 1000 μm or more, for example. In particular, when the length of the CNT composite assembled wire is 1000 μm or more, it is easy to place the CNT composite assembled wire at an arbitrary area by operating a manipulator, which is suitable from the viewpoint of fabricating a minute electric machine system (MEMS), for example. Although the upper limit value of the length of the CNT composite assembled wire is not particularly limited, it is preferably 600 mm or less from the viewpoint of manufacturing. The length of the CNT composite assembled wire can be measured by observation with the optical microscope or visual observation. When the CNT composite assembled wire has a curved shape rather than a linear shape, the length along a curve is measured.

The size of the diameter of the carbon nanotube composite assembled wire is not particularly limited, and can be adjusted as appropriate depending on the purpose. The diameter of the CNT composite assembled wire is preferably 10 μm or more, and further preferably 100 μm or more, for example. In particular, when the diameter of the CNT composite assembled wire is 100 μm or more, it is easy to place the CNT composite assembled wire at an arbitrary area by operating a manipulator, which is suitable from the viewpoint of fabricating a minute electric machine system (MEMS), for example. Although the upper limit value of the diameter of the CNT composite assembled wire is not particularly limited, it is preferably 1 mm or less from the viewpoint of manufacturing. In the present embodiment, the size of the diameter of the CNT composite assembled wire is smaller than the length of the CNT composite assembled wire.

In the present specification, the diameter of the carbon nanotube composite assembled wire means an average outer diameter of one CNT composite assembled wire. The average outer diameter of the one CNT composite assembled wire is obtained by observing cross sections at two arbitrary positions of the one CNT composite assembled wire with the optical microscope, measuring, in each cross section, an outer diameter, which is the distance between farthest two points on the outer circumference of the CNT composite assembled wire, and calculating an average value of the obtained outer diameters.

In the carbon nanotube composite assembled wire, the plurality of CNT composites only have to be assembled to form a CNT composite assembled wire having the shape of one string. It is only necessary for the plurality of CNT composites that at least some of the CNT composites are physically in contact with each other. Thus, all the CNT composites may be physically in contact with each other, or there may be CNT composites that are not in contact with each other.

(Carbon Nanotube Composite)

Each carbon nanotube composite includes one carbon nanotube (hereinafter also referred to as a CNT) and an amorphous carbon-containing layer that coats the carbon nanotube. The carbon nanotube has a D/G ratio of 0.1 or less, the D/G ratio being the ratio of the peak intensity of the D band to the peak intensity of the G band in the Raman spectroscopic analysis with a wavelength of 532 nm. The carbon nanotube composite is fibrous and has a diameter R of 0.1 µm or more and 50 µm or less.

The carbon nanotube composite has the shape of one fiber. The overall external appearance of the carbon nanotube composite can be a linear shape, or a curved shape such as a U shape.

The length of the carbon nanotube composite can be adjusted as appropriate depending on the purpose. The length of the CNT composite is preferably 10 µm or more, and further preferably 100 µm or more, for example. In particular, when the length of the CNT composite is 100 µm or more, such a length is suitable from the viewpoint of fabricating the CNT composite assembled wire. Although the upper limit value of the length of the CNT composite is not particularly limited, it is preferably 600 mm or less from the viewpoint of manufacturing. The length of the CNT composite can be measured by observation with the optical microscope. When the CNT composite has a curved shape rather than a linear shape, the length along a curve is measured.

The carbon nanotube composite has a diameter of 0.1 µm or more and 50 µm or less. Thereby, the CNT composite can be observed with the optical microscope, and is easily handled. The diameter of the CNT composite is preferably 0.1 µm or more and 5 µm or less, and further preferably 0.5 µm or more and 3 µm or less.

In the present specification, the diameter of the carbon nanotube composite means an average outer diameter of one CNT composite. The average outer diameter of the one CNT composite is obtained by observing cross sections at two arbitrary positions of the one CNT composite with the optical microscope, measuring, in each cross section, an outer diameter, which is the distance between farthest two points on the outer circumference of the CNT composite, and calculating an average value of the obtained outer diameters.

(Carbon Nanotube)

The structure of the carbon nanotube is not limited as long as the carbon nanotube has a D/G ratio of 0.1 or less, the D/G ratio being the ratio of the peak intensity of the D band to the peak intensity of the G band in the Raman spectroscopic analysis with a wavelength of 532 nm. Examples of the carbon nanotube that can be used include a single-layer carbon nanotube in which only a single carbon layer (graphene) has a cylindrical shape, a double-layer carbon nanotube or a multilayer carbon nanotube in which a stacked body of a plurality of carbon layers has a cylindrical shape, a cup stack-type nanotube having a structure in which graphenes in the shape of a bottomless paper cup are stacked, and the like.

The shape of the carbon nanotube is not particularly limited, and both a carbon nanotube having closed ends and a carbon nanotube having opened ends can be used. A catalyst used during fabrication of the carbon nanotube may adhere to one end or both ends of the carbon nanotube. In addition, a cone portion made of a conical graphene may be formed at one end or both ends of the carbon nanotube.

The length of the carbon nanotube can be selected as appropriate depending on the purpose. The length of the carbon nanotube is preferably 10 µm or more, and further preferably 100 µm or more, for example. In particular, when the length of the carbon nanotube is 100 µm or more, such a length is suitable from the viewpoint of fabricating the CNT composite assembled wire. Although the upper limit value of the length of the carbon nanotube is not particularly limited, it is preferably 600 mm or less from the viewpoint of manufacturing. The length of the CNT can be measured by observation with a scanning electron microscope.

The diameter of the carbon nanotube is preferably 0.6 nm or more and 20 nm or less, and further preferably 1 nm or more and 10 nm or less. In particular, when the diameter of the carbon nanotube is 1 nm or more and 10 nm or less, such a diameter is suitable from the viewpoint of heat resistance under oxidizing conditions.

In the present specification, the diameter of the carbon nanotube means an average outer diameter of one CNT. The average outer diameter of the one CNT can be calculated by directly observing a projection image of the CNT with a transmission electron microscope and performing measurement. Alternatively, the average outer diameter of the one CNT can be obtained by measuring a Raman shift value in a radial breathing mode specific to the CNT using Raman spectroscopy, and performing a calculation from a relational expression of the diameter of the CNT and the Raman shift value. When the CNT includes a cone portion at one end or both ends thereof, measurement is performed at the location other than the cone portion.

The carbon nanotube has a D/G ratio of 0.1 or less, the D/G ratio being the ratio of the peak intensity of the D band to the peak intensity of the G band in the Raman spectroscopic analysis with a wavelength of 532 nm. The D/G ratio will be described using a Raman spectrum of the carbon nanotube obtained by the Raman spectroscopic analysis.

The G band is a peak originating in the CNT seen in the vicinity of a Raman shift of 1590 $cm^{-1}$ in the Raman spectrum obtained by the Raman spectroscopic analysis method. The D band is a peak originating in amorphous carbon or a defect in graphite or the CNT seen in the vicinity of a Raman shift of 1350 $cm^{-1}$ in the Raman spectrum obtained by the Raman spectroscopic analysis method. Therefore, as the D/G ratio has a smaller value, the carbon nanotube has a higher crystallinity, and the carbon nanotube contains a smaller amount of amorphous carbon or defective graphite.

Each CNT included in the CNT composite assembled wire in accordance with the present embodiment has a D/G ratio of 0.1 or less, contains less amorphous carbon or defective graphite, and has a high crystallinity. Thus, the CNT can have a high tensile strength and a high electrical conductivity. If the D/G ratio of the CNT exceeds 0.1, the CNT may be unable to have a sufficient tensile strength and a high electrical conductivity. Further, if the D/G ratio of the CNT exceeds 0.1, the CNT itself may deteriorate when the amorphous carbon-containing layer is removed from each CNT composite in a method for manufacturing a heat-treated body of a carbon nanotube composite assembled wire in a fourth embodiment described later. The D/G ratio is preferably 0.1 or less, and more preferably 0.01 or less. Although the lower limit value of the D/G ratio is not particularly limited, it can be 0 or more, for example.

In the present specification, the D/G ratio of each carbon nanotube in the carbon nanotube composite assembled wire is a value measured by the following method.

First, a carbon nanotube composite assembled wire is heat-treated at a temperature of 650° C. for 60 minutes in the atmosphere. Thereby, the amorphous carbon-containing layers are removed from the carbon nanotube composite assembled wire, and thereby a heat-treated body of the carbon nanotube composite assembled wire is obtained. Raman spectroscopic analysis is performed on the heat-treated body of the carbon nanotube composite assembled wire under the following conditions to obtain a Raman spectrum (hereinafter also referred to as a Raman spectrum of the heat-treated body of the CNT composite assembled wire). A D/G ratio is calculated from a peak intensity of a D band and a peak intensity of a G band in the Raman spectrum of the heat-treated body of the CNT composite assembled wire. The D/G ratio of the heat-treated body of the CNT composite assembled wire is regarded as the D/G ratio of each carbon nanotube in the carbon nanotube composite assembled wire.

Measurement Conditions for Raman Spectroscopic Analysis

Wavelength: 532 nm
Laser power: 17 mW
Exposure time: one second
Average number of times: three times
Objective lens magnification: 50 times The reason for regarding that the D/G ratio of each CNT in the CNT composite assembled wire in accordance with the present embodiment is the same as the D/G ratio of the heat-treated body of the CNT composite assembled wire is as follows.

The present inventors performed Raman spectroscopic analysis on each of a plurality of carbon nanotubes before being coated with an amorphous carbon-containing layer under the same conditions as those described above, to obtain a Raman spectrum (hereinafter also referred to as a CNT Raman spectrum). A D/G ratio was calculated from a peak intensity of a D band and a peak intensity of a G band in each of a plurality of obtained CNT Raman spectra.

Then, each carbon nanotube was coated with the amorphous carbon-containing layer to prepare a CNT composite. A plurality of CNT composites were assembled to be oriented in a longitudinal direction thereof to obtain a carbon nanotube composite assembled wire. The CNT composite assembled wire was heat-treated at a temperature of 650° C. for 60 minutes, and thereby the amorphous carbon-containing layers were removed from the CNT composite assembled wire to obtain a heat-treated body of the CNT composite assembled wire. Raman spectroscopic analysis was performed on the heat-treated body of the CNT composite assembled wire under the above conditions to obtain a Raman spectrum (hereinafter also referred to as a Raman spectrum of the heat-treated body of the CNT composite assembled wire). A D/G ratio was calculated from a peak intensity of a D band and a peak intensity of a G band in the Raman spectrum of the heat-treated body of the CNT composite assembled wire.

It was confirmed that a value obtained by averaging data of the D/G ratios calculated above of the plurality of carbon nanotubes before being coated with the amorphous carbon-containing layers is substantially the same as the value of the D/G ratio of the heat-treated body of the CNT composite assembled wire obtained by removing the amorphous carbon-containing layers from the CNT composite assembled wire. This indicates that the D/G ratios of the carbon nanotubes before being coated with the amorphous carbon-containing layers are maintained in the CNTs in the CNT composite assembled wire and the CNTs in the heat-treated body of the CNT composite assembled wire. Therefore, in the present specification, the D/G ratio of each carbon nanotube in the CNT composite assembled wire can be regarded as the same as the D/G ratio of the heat-treated body of the CNT composite assembled wire.

It should be noted that, when Raman spectroscopic analysis (wavelength: 532 nm) is performed on the carbon nanotube composite assembled wire to obtain a Raman spectrum, a peak of a D band is clearly confirmed. The D band is considered to originate in the amorphous carbon-containing layers included in the CNT composite assembled wire.

The method for manufacturing the carbon nanotubes is not particularly limited as long as it is a method capable of obtaining carbon nanotubes satisfying the D/G ratio described above. Examples of such a method include a thermal decomposition method of thermally decomposing a source gas such as an alcohol-based or a hydrocarbon-based source gas within a heating furnace using catalyst particles having a nanometer level diameter, to grow carbon crystals on the catalyst particles and obtain carbon nanotubes. Examples of the thermal decomposition method include a method of causing catalyst particles to be carried on a base material by coating or the like to grow CNTs on the catalyst particles, a method of causing a catalyst to be suspended in a vapor phase to grow CNTs on the catalyst, and a method of separating a plurality of catalyst particles in a close contact state in a flow of a source gas to grow CNTs between the plurality of catalyst particles.

(Amorphous Carbon-Containing Layer)

The amorphous carbon-containing layer is a layer (region) containing amorphous carbon. Amorphous carbon is not particularly limited, and conventionally known amorphous carbon can be used. Examples of amorphous carbon that can be used include ta-C (tetrahedral amorphous carbon), μ-C (amorphous carbon), ta-C:H (tetrahedral amorphous carbon hydride), and a-C: H (amorphous carbon hydride). Especially, it is preferable to use a-C because the amorphous carbon-containing layer can be formed by a simple technique. Amorphous carbon having a ratio of SP3/SP2 of 0.2 or more and 0.8 or less can be used, for example.

The amorphous carbon-containing layer preferably has a D/G ratio of 0.5 or more, the D/G ratio being a ratio of a peak intensity of a D band to a peak intensity of a G band in Raman spectroscopic analysis with a wavelength of 532 nm. Thereby, only the amorphous carbon-containing layer can be removed by heat treatment. The D/G ratio of the amorphous carbon-containing layer is more preferably 0.7 or more, and further preferably 1.0 or more. Although the upper limit value of the D/G ratio of the amorphous carbon-containing layer is not particularly limited, it is preferably 2.0 or less, for example. Here, the D/G ratio of the amorphous carbon-containing layer can be regarded as the same as the D/G ratio of each carbon nanotube composite. This is because the volume ratio of the CNT in the CNT composite is $10^{-7}$ volume % or less, which is extremely small, and thus it is considered that the influence of the D/G ratio of the CNT on the D/G ratio of the CNT composite is negligible.

Since the conditions for the Raman spectroscopic analysis performed to calculate the D/G ratio of the amorphous carbon-containing layer are the same as the conditions for the Raman spectroscopic analysis performed to calculate the D/G ratio of the carbon nanotube described above, the description thereof will not be repeated.

The content of amorphous carbon in the amorphous carbon-containing layer is preferably 1 volume % or more, more preferably 10 volume % or more, and further preferably 50 volume % or more. Although the upper limit value of the content of amorphous carbon in the amorphous carbon-containing layer is not particularly limited, it can be 100 volume %, for example. The content of amorphous carbon in the amorphous carbon-containing layer can be measured by a thermogravimetric analysis method.

The amorphous carbon-containing layer may be made of amorphous carbon only, or may contain graphite microcrystals, tar, and an organic compound produced by thermal decomposition, in addition to amorphous carbon.

Graphite microcrystals mean crystal particles made of graphite having a volume average particle diameter of 1 nm or more and 50 nm or less. In the present specification, the "volume average particle diameter" means a median diameter (d50) in volume-based particle size distribution (volume distribution), and means an average particle diameter of all graphite microcrystals contained in the amorphous carbon-containing layer. It should be noted that, in the present specification, the "volume average particle diameter" may simply be referred to as a "particle diameter".

The particle diameter of each graphite microcrystal for calculating the particle diameter (volume average particle diameter) of graphite microcrystals can be measured by the following method. First, a reflected electron image of the amorphous carbon-containing layer at an arbitrary region in an arbitrary cross section of the CNT composite is observed with an electron microscope at a magnification of 5000 times. Then, in the reflected electron image, a diameter of a circle circumscribed about a particle constituting each graphite microcrystal (that is, a circumscribed circle equivalent diameter) is measured, and the diameter is determined as a particle diameter of the graphite microcrystal.

Based on the particle diameters of graphite microcrystals obtained above, the volume average particle diameter is calculated.

The content of graphite microcrystals in the amorphous carbon-containing layer is preferably 99 volume % or less, more preferably 90 volume % or less, and further preferably 50 volume % or less. Although the lower limit value of the content of graphite microcrystals in the amorphous carbon-containing layer is not particularly limited, it can be 1 volume %, for example. The content of graphite microcrystals in the amorphous carbon-containing layer can be measured by observation with a transmission electron microscope or a thermogravimetric analysis method.

The thickness of the amorphous carbon-containing layer is preferably 0.05 μm or more and 25 μm or less. Here, the thickness of the amorphous carbon-containing layer means an average value of shortest distances each extending from one arbitrary point on the outer circumference of the CNT to one arbitrary point on the outer circumference of the CNT composite in a cross section of the CNT composite. Thus, since the carbon nanotube composite has a sufficient diameter, the CNT composite is easily handled. The thickness of the amorphous carbon-containing layer is more preferably 0.05 μm or more and 2.5 μm or less, and further preferably 0.25 μm or more and 1.5 μm or less. The thickness of the amorphous carbon-containing layer is obtained by observing cross sections of the CNT composite at two arbitrary positions with the electron microscope to measure thicknesses of the amorphous carbon-containing layer, and calculating an average value of the obtained thicknesses.

Second Embodiment: Heat-Treated Body of Carbon Nanotube Composite Assembled Wire A heat-treated body of a carbon nanotube composite assembled wire in accordance with the present embodiment is a body obtained by heat-treating the carbon nanotube composite assembled wire of the first embodiment described above.

The amorphous carbon-containing layers included in the carbon nanotube composites constituting the carbon nanotube composite assembled wire can be removed by performing heat treatment. Therefore, the heat-treated body of the carbon nanotube composite assembled wire includes a plurality of refined carbon nanotubes obtained by removing the amorphous carbon-containing layers from the plurality of carbon nanotube composites, and the plurality of refined carbon nanotubes are assembled to be oriented along a longitudinal direction of the heat-treated body of the CNT composite assembled wire.

Figure 6:
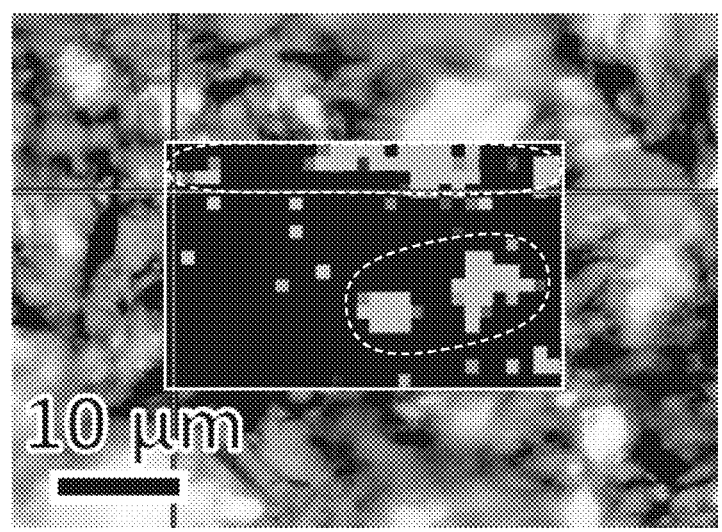
FIG. 6 is a view showing a Raman mapping image of a G band of a heat-treated body of the carbon nanotube composite assembled wire in accordance with one embodiment of the present disclosure.
Figure 7:
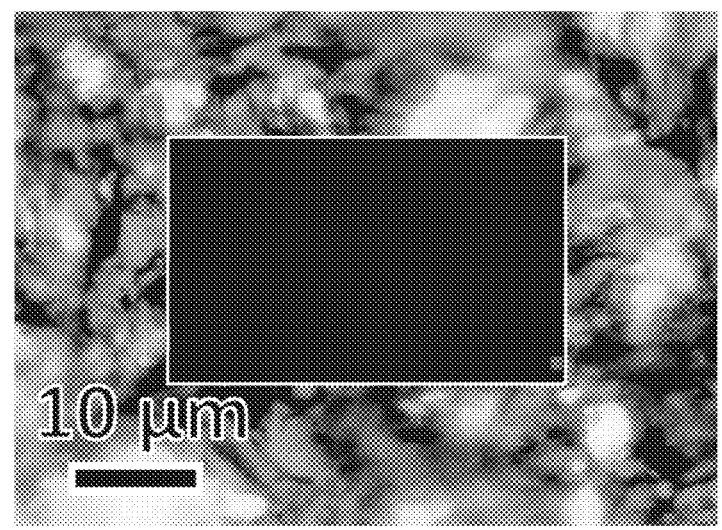
FIG. 7 is a view showing a Raman mapping image of a D band of the heat-treated body of the carbon nanotube composite assembled wire in accordance with one embodiment of the present disclosure.

A method for confirming that the heat-treated body of the carbon nanotube composite assembled wire includes the plurality of refined carbon nanotubes and does not include the amorphous carbon-containing layers will be described with reference to FIGS. 6 and 7. FIG. 6 is a Raman mapping image of the G band of the heat-treated body of the carbon nanotube composite assembled wire in accordance with the present embodiment. FIG. 7 is a Raman mapping image of the D band of the heat-treated body of the carbon nanotube composite assembled wire identical to that in FIG. 6.

Raman spectroscopic analysis is performed on the heat-treated body of the carbon nanotube composite assembled wire under the same conditions as those in the first embodiment, to produce the Raman mapping image of the G band (see FIG. 6) and the Raman mapping image of the D band (see FIG. 7). Each Raman mapping image is obtained by measuring Raman spectra at intervals of 1 μm by a point mapping method, using an inVia Raman microscope manufactured by Renishaw and WiRE software.

In FIGS. 6 and 7, the part surrounded by a thick line at the central portion shows a two-dimensional profile of a G band/D band intensity for the heat-treated body of the carbon nanotube composite assembled wire placed on a quartz substrate. The two-dimensional profile is obtained by performing binarization processing on each Raman mapping image in order to minimize the influence of the background.

In the Raman mapping image of the G band shown in FIG. 6, a light-colored portion indicates that the peak intensity of the G band is high, a dark-colored portion indicates that the peak intensity of the G band is low, and in particular, a black portion indicates that the G band is not detected. Here, the G band is a peak originating in a CNT. Therefore, in FIG. 6, it can be confirmed that a plurality of high crystallinity refined carbon nanotubes exist in portions surrounded by broken lines. It should be noted that the existence of the plurality of refined carbon nanotubes can be confirmed from the observation that the size of the light-colored portion is sufficiently larger than that of one CNT.

On the other hand, in the Raman mapping image of the D band, a light-colored portion indicates that the peak intensity of the D band is high, a dark-colored portion indicates that the peak intensity of the D band is low, and in particular, a black portion indicates that the D band is not detected. Here, the D band is a peak originating in amorphous carbon or a defect in graphite. Therefore, in FIG. 7, it can be confirmed that amorphous carbon or a defect in graphite does not exist at the same positions as the portions surrounded by the broken lines in FIG. 6.

That is, it can be confirmed from FIGS. 6 and 7 that, in the portions surrounded by the broken lines, high crystallinity refined carbon nanotubes exist and the amorphous carbon-containing layers do not exist.

As described above, it is possible to confirm that the heat-treated body of the carbon nanotube composite assembled wire includes the plurality of refined carbon nanotubes and does not include the amorphous carbon-containing layers, by producing the Raman mapping image of the G band and the Raman mapping image of the D band for the heat-treated body of the carbon nanotube composite assembled wire, and analyzing these Raman mapping images.

The heat-treated body of the carbon nanotube composite assembled wire has the shape of a string in which the plurality of refined carbon nanotubes are assembled to be oriented in a longitudinal direction thereof. The overall external appearance of the heat-treated body of the carbon nanotube composite assembled wire is not particularly limited, and can be any external appearance according to the purpose. For example, the external appearance can be a linear shape or a curved shape.

The length of the heat-treated body of the carbon nanotube composite assembled wire is not particularly limited, and can be adjusted as appropriate depending on the purpose. The length of the heat-treated body of the CNT composite assembled wire is preferably 10 µm or more, more preferably 100 µm or more, and further preferably 1000 µm or more, for example. In particular, when the length of the heat-treated body of the CNT composite assembled wire is 1000 µm or more, it becomes easy to fabricate a long string-like CNT strand by stranding a plurality of heat-treated bodies of the CNT composite assembled wires. Further, the heat-treated body of the CNT composite assembled wire facilitates placing the CNT composite assembled wire at an arbitrary area by operating a manipulator, which is suitable for fabricating a minute electric machine system (MEMS), for example. Although the upper limit value of the length of the heat-treated body of the CNT composite assembled wire is not particularly limited, it is preferably 600 mm or less from the viewpoint of manufacturing. The length of the heat-treated body of the CNT composite assembled wire can be measured by observation with an optical microscope or visual observation. When the heat-treated body of the CNT composite assembled wire has a curved shape rather than a linear shape, the length along a curve is measured.

The size of the diameter of the heat-treated body of the carbon nanotube composite assembled wire is not particularly limited, and can be adjusted as appropriate depending on the purpose. The diameter of the heat-treated body of the CNT composite assembled wire is preferably 0.01 µm or more, and further preferably 1 µm or more, for example. In particular, when the diameter of the heat-treated body of the CNT composite assembled wire is 1 µm or more, it becomes easy to fabricate a CNT strand. Although the upper limit value of the diameter of the heat-treated body of the CNT composite assembled wire is not particularly limited, it is preferably 10 µm or less from the viewpoint of manufacturing.

In the present specification, the diameter of the heat-treated body of the carbon nanotube composite assembled wire means an average outer diameter of a heat-treated body of one CNT composite assembled wire. The average outer diameter of the heat-treated body of the one CNT composite assembled wire is obtained by observing cross sections at two arbitrary positions of the heat-treated body of the one CNT composite assembled wire with a scanning electron microscope, measuring, in each cross section, an outer diameter, which is the distance between farthest two points on the outer circumference of the heat-treated body of the CNT composite assembled wire, and calculating an average value of the obtained outer diameters.

The heat-treated body of the carbon nanotube composite assembled wire preferably has a D/G ratio of 0.1 or less, the D/G ratio being the ratio of the peak intensity of the D band to the peak intensity of the G band in the Raman spectroscopic analysis with a wavelength of 532 nm. Thereby, the heat-treated body of the carbon nanotube composite assembled wire can have a high crystallinity. Therefore, the heat-treated body of the carbon nanotube composite assembled wire can have a high tensile strength and a high electrical conductivity. The D/G ratio is preferably 0.01 or less. Although the lower limit value of the D/G ratio is not particularly limited, it can be 0.001 or more, for example.

Since the conditions for the Raman spectroscopic analysis for calculating the D/G ratio of the heat-treated body of the carbon nanotube composite assembled wire are the same as the conditions for the Raman spectroscopic analysis performed to calculate the D/G ratio of the CNT described in the first embodiment, the description thereof will not be repeated.

Third Embodiment: Method for Manufacturing Carbon Nanotube Composite Assembled Wire A method for manufacturing a carbon nanotube composite assembled wire in accordance with the present embodiment includes a first step of preparing a plurality of carbon nanotubes, a second step of obtaining a plurality of carbon nanotube composites by coating each of the plurality of carbon nanotubes with an amorphous carbon-containing layer, and a third step of obtaining a carbon nanotube composite assembled wire by assembling the plurality of carbon nanotube composites to be oriented in a longitudinal direction thereof.

(First Step)

In the first step, a plurality of carbon nanotubes are prepared. Each carbon nanotube can be the same as the carbon nanotube described in the first embodiment.

The method for preparing each carbon nanotube is not particularly limited, and a commercially available carbon nanotube may be used, or a carbon nanotube fabricated by a conventionally known method can be used. Especially, it is preferable to prepare a carbon nanotube fabricated by a method of separating a plurality of catalyst particles in a close contact state in a flow of a source gas to grow CNTs between the plurality of catalyst particles (hereinafter also referred to as a floating bridge (FB) method), because a carbon nanotube having a high crystallinity and composed of only six-membered rings is obtained.

Figure 8:
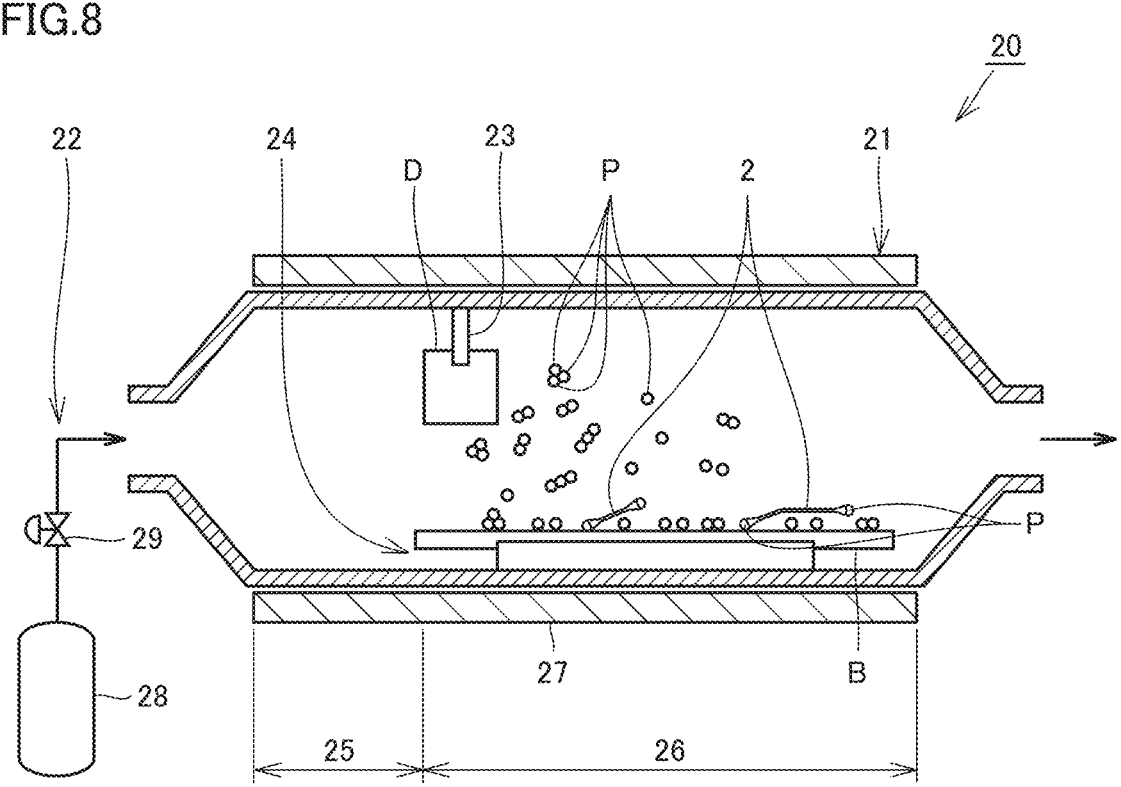
FIG. 8 is a view showing an example of a carbon nanotube manufacturing apparatus.
Figure 9:
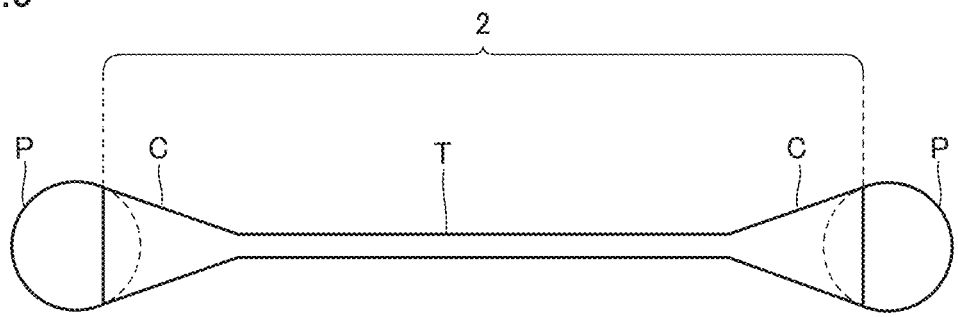
FIG. 9 is a view showing an example of the carbon nanotube used in one embodiment of the present disclosure.

The FB method can be performed, for example, using a carbon nanotube manufacturing apparatus 20 shown in FIG. 8. Carbon nanotube manufacturing apparatus 20 includes a tubular reaction chamber 21, a gas supplying mechanism 22 for supplying a carbon-containing gas into reaction chamber 21 from one end of reaction chamber 21, a catalyst supplying mechanism 23 for releasing a plurality of catalyst particles P in a contact state into the carbon-containing gas flowing through reaction chamber 21, and a substrate holding mechanism 24 placed within reaction chamber 21 for holding a substrate B that captures catalyst particles P.

<Reaction Chamber>

Reaction chamber 21 laminarizes the flow of the carbon-containing gas in an entrance zone 25 upstream of catalyst supplying mechanism 23, and uses the laminarized carbon-containing gas to form carbon nanotubes in a formation zone 26 downstream of catalyst supplying mechanism 23.

Reaction chamber 21 is provided with a heater 27. That is, reaction chamber 21 is heated by heater 27.

The internal temperature in formation zone 26 of reaction chamber 21 is preferably 800° C. or more and 1200° C. or less. In order to maintain such a temperature, the carbon-containing gas may be heated and then supplied from gas supplying mechanism 22 into reaction chamber 21, or the carbon-containing gas may be heated in entrance zone 25.

<Gas Supplying Mechanism>

Gas supplying mechanism 22 can have a gas cylinder 28 and a flow control valve 29 to supply the carbon-containing gas into reaction chamber 21.

As the carbon-containing gas supplied from gas supplying mechanism 22, a reductive gas such as hydrocarbon gas is used. As such a carbon-containing gas, a mixed gas of acetylene and nitrogen or argon, methane, or the like can be used, for example.

The lower limit of the average flow rate of the carbon-containing gas supplied from gas supplying mechanism 22 within the reaction chamber is 0.05 cm/sec, preferably 0.10 cm/sec, and more preferably 0.20 cm/sec. On the other hand, the upper limit of the average flow rate of the carbon-containing gas within reaction chamber 21 is preferably 10.0 cm/sec, and more preferably 0.5 cm/sec. If the average flow rate of the carbon-containing gas within reaction chamber 21 is less than the lower limit, the wind pressure may be insufficient to elongate the carbon nanotubes formed between catalyst particles P. On the contrary, if the average flow rate of the carbon-containing gas within reaction chamber 21 exceeds the upper limit, the carbon nanotubes may be detached from catalyst particles P, which may stop the growth of the carbon nanotubes and consequently inhibit the formation of the carbon nanotubes.

The lower limit of the Reynolds number of the flow of the carbon-containing gas supplied from gas supplying mechanism 22 within reaction chamber 21 is preferably 0.01, and more preferably 0.05. On the other hand, the upper limit of the Reynolds number described above is 1000, preferably 100, and more preferably 10. If the Reynolds number is less than the lower limit, design is excessively restricted, which may make carbon nanotube manufacturing apparatus 20 unnecessarily expensive and may make the manufacturing efficiency of the carbon nanotubes unnecessarily low. If the Reynolds number exceeds the upper limit, the flow of the carbon-containing gas may be disturbed, which may inhibit production of the carbon nanotubes and elongation of the carbon nanotubes between catalyst particles P.

Preferably, gas supplying mechanism 22 can repeatedly change the amount of the carbon-containing gas to be supplied to reaction chamber 21. Thereby, the flow rate of the carbon-containing gas in reaction chamber 21 increases or decreases, which promotes separation of the plurality of combined catalyst particles, whereby increases the number of carbon nanotubes to be obtained.

<Catalyst Supplying Mechanism>

Catalyst supplying mechanism 23 can be a mechanism for holding, in the flow of the carbon-containing gas, a disintegrable catalyst D which disintegrates and is divided into the plurality of catalyst particles P when subjected to the wind pressure of the carbon-containing gas. Catalyst supplying mechanism 23 may be a mechanism for holding a long-sized disintegrable catalyst D having a band shape or a rod shape, for example, and gradually feeding disintegrable catalyst D into reaction chamber 21. By using disintegrable catalyst D in this manner, it is possible to form the plurality of catalyst particles P at a high temperature and in the contact state in the flow of the carbon-containing gas, which makes it possible to reliably grow the carbon nanotubes between the plurality of catalyst particles.

As disintegrable catalyst D, metal foil which is easy to form fine catalyst particles P is suitably used. Examples of the material for disintegrable catalyst D can include iron, nickel, and the like, and especially, high-purity iron excellent in disintegration property and catalysis is particularly preferable. It is considered that, when the high-purity iron is heated to a high temperature and is exposed to the carbon-containing gas within reaction chamber 21, iron carbide ($Fe_3C$) is formed on the surface thereof due to carburization, and thereby the high-purity iron easily disintegrates from the surface and can release catalyst fine particles P sequentially. In this case, the main ingredient of formed catalyst particles P is iron carbide or iron oxide ($Fe_2O_3$).

The lower limit of the average diameter of catalyst particles P to be finally captured by substrate B is preferably 30 nm, more preferably 40 nm, and further preferably 50 nm. On the other hand, the upper limit of the average diameter of catalyst particles P to be captured by substrate B is preferably 1000 μm, more preferably 100 μm, and further preferably 10 μm. If the average diameter of catalyst particles P to be captured by substrate B is less than the lower limit, the carbon nanotubes formed from the catalyst particles have a small diameter and a low elongation ratio, which may make it impossible to sufficiently elongate the carbon nanotubes. On the contrary, if the average diameter of the catalyst particles to be captured by the substrate exceeds the upper limit, it may be difficult to elongate the carbon nanotubes formed from the catalyst particles.

The lower limit of the average thickness of the metal foil used as disintegrable catalyst D is preferably 1 μm, and more preferably 2 μm. On the other hand, the upper limit of the average thickness of the metal foil used as disintegrable catalyst D is preferably 500 μm, and more preferably 200 μm. If the average thickness of the metal foil used as disintegrable catalyst D is less than the lower limit, the metal foil may be broken and blown by the carbon-containing gas. On the contrary, if the average thickness of the metal foil used as disintegrable catalyst D exceeds the upper limit, the disintegration rate may be decreased, which may lower the formation efficiency of the carbon nanotubes.

<Substrate Holding Mechanism>

Substrate holding mechanism 24 holds substrate B below a catalyst supplying position of catalyst supplying mechanism 23 such that substrate B extends downstream along the flow direction of the carbon-containing gas. Preferably, substrate B is held to extend widely in a range where catalyst particles P may fall thereon, in consideration of the falling speed of catalyst particles P in the flow of the carbon-containing gas.

Substrate holding mechanism 24 allows substrate B to capture catalyst particles P released from catalyst supplying mechanism 23 and hold catalyst particles P at captured positions against the flow of the carbon-containing gas. Thereby, due to the wind pressure of the carbon-containing gas applied to a carbon nanotube that extends from a catalyst particle P held on substrate B and to another catalyst particle P at the other end of the carbon nanotube, the carbon nanotube that extends from catalyst particle P held on substrate B is pulled and plastically deformed, and is elongated in a longitudinal direction with the diameter thereof being decreased.

Even during such elongation of the carbon nanotube, the carbon nanotube with the original diameter grows on catalyst particle P. Thus, the carbon nanotube fabricated by the FB method using carbon nanotube manufacturing apparatus 20 can include a tubular tube portion T and conical cone portions C which expand continuously in diameter from ends of the tube portion, as shown in FIG. 6.

That is, carbon nanotube manufacturing apparatus 20 elongates the carbon nanotube formed by the vapor phase growth method, simultaneously with the formation thereof, using the wind pressure of the carbon-containing gas, and thereby converts some hexagonal cells of the carbon nanotube into pentagonal cells to form the conical cone portion, and converts the pentagonal cells again into hexagonal cells to form the tube portion which is a carbon nanotube with a smaller diameter.

Since carbon nanotube manufacturing apparatus 20 elongates the carbon nanotube that grows on catalyst particle P, it can form the tube portion at an extremely high speed as compared with the growth speed of the carbon nanotube on catalyst particle P, which makes it possible to form a long carbon nanotube in a relatively short time. Thus, a sufficiently long carbon nanotube can be formed even if the time for which the conditions for allowing the carbon nanotube to continuously grow on catalyst particle P can be maintained is short.

It is considered that carbon nanotube manufacturing apparatus 20 promotes incorporation of carbon atoms at the growth point of the carbon nanotube by applying a tension to the carbon nanotube on catalyst particle P using the wind pressure of the carbon-containing gas. Thereby, it is considered that carbon nanotube manufacturing apparatus 20 can further increase the growth rate of the carbon nanotube, and thus the increase rate of the length of the obtained carbon nanotube.

It is considered that, in carbon nanotube manufacturing apparatus 20, by applying a tension to the carbon nanotube on catalyst particle P using the wind pressure of the carbon-containing gas, the carbon nanotube is less likely to be curved, and thus a linear carbon nanotube including tube portion T composed of only six-membered rings of carbon can be obtained. The carbon nanotube composed of only six-membered rings of carbon is less likely to be deteriorated even when it is exposed to a high temperature oxidative gas (atmosphere) in a third step of the third embodiment described later, and thus can maintain quality.

On the other hand, if the carbon nanotube contains five-membered rings or seven-membered rings of carbon in addition to the six-membered rings of carbon, a curve originating in the five-membered rings or seven-membered rings is likely to be produced. When the carbon nanotube containing the curve is exposed to the high temperature oxidative gas (atmosphere) in the third step of the third embodiment described later, a hole is formed in this curve portion because the reaction proceeds faster, and this curve portion is deteriorated because a dangling bond is formed, causing quality deterioration. In the carbon nanotube with such a deteriorated quality, a strong D band peak is confirmed in Raman spectroscopic analysis.

As substrate B, a silicon substrate, a heat-resistant glass substrate made of such as quartz glass, a ceramic substrate made of such as alumina, or the like can be used, for example. Further, substrate holding mechanism 24 may move a long-sized substrate or a plurality of substrates along the flow direction of the carbon-containing gas. By moving substrate B in this manner, the carbon nanotube manufacturing apparatus can prevent the surface of substrate B from being filled up with catalyst particles P, and continuously manufacture the carbon nanotubes.

(Second Step)

In the second step, a plurality of carbon nanotube composites are obtained by coating each of the plurality of carbon nanotubes prepared in the first step with an amorphous carbon-containing layer.

In conventional methods for manufacturing a carbon nanotube, by-products such as amorphous carbon and graphite microcrystals may be formed simultaneously with the production of the carbon nanotube. Since such by-products affect the electrical conductivity and mechanical characteristics of the carbon nanotube itself, the original characteristics of the carbon nanotube such as electrical conductivity and mechanical characteristics are deteriorated. Accordingly, for conventional carbon nanotubes, techniques of removing by-products such as amorphous carbon and graphite microcrystals have been studied to increase the crystallinity of the carbon nanotubes.

There have also been studied methods for manufacturing a carbon nanotube capable of obtaining a high crystallinity carbon nanotube without forming by-products such as amorphous carbon during the production of the carbon nanotube. However, since the high crystallinity carbon nanotube is extremely small with a diameter of about 0.8 nm to 10 nm, the carbon nanotube cannot be observed with an optical microscope. Thus, it has been difficult to handle the carbon nanotube.

As a result of earnest studies on a method for facilitating handling of a high crystallinity carbon nanotube, the present inventors have newly found that, by coating the carbon nanotube with an amorphous carbon-containing layer to have an increased diameter, the carbon nanotube can be observed with an optical microscope and is easily handled. Means of forming a carbon nanotube composite by coating a high crystallinity carbon nanotube with an amorphous carbon-containing layer is based on a technical idea completely opposite to a conventional technical idea of removing by-products such as amorphous carbon and graphite microcrystals contained in a carbon nanotube.

Examples of the method for coating the carbon nanotube with the amorphous carbon-containing layer include heat-treating the carbon nanotube at a temperature of 950° C. or more and 1100° C. or less in a hydrocarbon-based gas. Here, examples of the hydrocarbon-based gas that can be used include methane gas, ethylene gas, acetylene gas, ethanol gas, and benzene gas. The temperature of the heat treatment is preferably 950° C. or more and 1050° C. or less. The duration time of the heat treatment is changed as appropriate depending on the temperature of the heat treatment and the target thickness of the amorphous carbon-containing layer. The duration time of the heat treatment is preferably 1 minute or more and 60 minutes or less, and further preferably 5 minutes or more and 30 minutes or less, for example.

The total concentration of the methane gas, the ethylene gas, the acetylene gas, the ethanol gas, and the benzene gas in the hydrocarbon-based gas is preferably 1 volume % or more, more preferably 70 volume % or more, and further preferably 100 volume % or more. If the total concentration is less than 1 volume %, the formation speed of the amorphous carbon-containing layer may become slow. On the other hand, the upper limit of the total concentration is not particularly limited, and is preferably 100 volume % from the viewpoint of improving the formation speed of the amorphous carbon-containing layer. Besides the methane gas, the ethylene gas, the acetylene gas, the ethanol gas, and the benzene gas, the hydrocarbon-base gas may include an inert gas such as helium gas, argon gas, or nitrogen gas which does not promote oxidation of the amorphous carbon-containing layer, and/or a reductive gas such as hydrogen gas.

The average flow rate of the hydrocarbon-based gas within the reaction chamber is preferably 0.05 cm/sec or more, more preferably 0.10 cm/sec or more, and further preferably 0.20 cm/sec or more. If the average flow rate of the hydrocarbon-based gas is less than 0.05 cm/sec, the formation speed of the amorphous carbon-containing layer may be significantly decreased. On the other hand, the upper limit of the average flow rate of the hydrocarbon-based gas within the reaction chamber is preferably 10.0 cm/sec or less, more preferably 1 cm/sec or less, and further preferably 0.50 cm/sec or less. If the average flow rate of the hydrocarbon-based gas exceeds 10.0 cm/sec, the hydrocarbon-based gas may pass through the reaction chamber before reaching the thermal decomposition temperature of the hydrocarbon-based gas, and the amorphous carbon-containing layer may not be formed.

Each carbon nanotube composite obtained in the second step has a large diameter, can be observed with an optical microscope, and is easily handled.

(Third Step)

In the third step, a carbon nanotube composite assembled wire is obtained by assembling the plurality of carbon nanotube composites prepared in the second step to be oriented in a longitudinal direction thereof. The expression "assembling the plurality of carbon nanotube composites to be oriented in a longitudinal direction thereof" means assembling the plurality of carbon nanotube composites to be aligned such that the longitudinal direction of each of the plurality of carbon nanotube composites extends in substantially the same direction. It should be noted that the expression "substantially the same direction" means that the maximum angle formed between two different carbon nanotube composites included in the carbon nanotube composite assembled wire is −10° or less.

The method for assembling the plurality of carbon nanotube composites is not particularly limited as long as it is any method capable of assembling the carbon nanotube composites to be oriented in the longitudinal direction thereof. Examples of the method that can be used include a method of placing each carbon nanotube composite one by one to be aligned in a predetermined direction to obtain a carbon nanotube composite assembled wire, a method of dispersing carbon nanotube composites in a liquid phase or a vapor phase and then flowing the liquid phase or the vapor phase in a constant direction to obtain a CNT composite assembled wire, a method of dry-spinning a carbon nanotube composite vertically oriented relative to the surface of a substrate, and an electric field spinning method. Especially, the method using a liquid phase is preferable from the viewpoint of easy operation.

When a liquid phase is used for the method for assembling the plurality of carbon nanotube composites, the third step preferably includes a third a step of obtaining a carbon nanotube composite dispersion liquid by dispersing the plurality of carbon nanotube composites in a solvent, a third b step of orienting the plurality of carbon nanotube composites in a specific direction by flowing the carbon nanotube composite dispersion liquid in the specific direction, and a third c step of obtaining the carbon nanotube composite assembled wire by removing the solvent from the carbon nanotube composite dispersion liquid after the third b step.

In the third a step, examples of the solvent that can be used include methanol, ethanol, propanol, toluene, 1,2-dichloroethane, 1,2-dichlorobenzene, o-dichlorobenzene, carbon disulfide, dimethylsulfoxide, N,N-dimethylformamide, and pure water.

In the third b step, examples of the method of flowing the carbon nanotube composite dispersion liquid in the specific direction include a method of preparing a substrate including a groove formed in the specific direction, and flowing the carbon nanotube composite dispersion liquid from one direction of the groove in the substrate along a longitudinal direction of the groove in the substrate. Thereby, a longitudinal direction of the plurality of carbon nanotube composites in the carbon nanotube composite dispersion liquid is oriented along the longitudinal direction of the groove in the substrate.

When flowing the carbon nanotube composite dispersion liquid through the groove, it is preferable to adjust the flow rate of the carbon nanotube composite dispersion liquid such that the carbon nanotube composite dispersion liquid does not flow out of the groove.

Examples of the substrate that can be used include a quartz substrate, silicon, silicon oxide, alumina, and silicon nitride.

The size of the groove in the substrate can be selected as appropriate depending on the purpose of the heat-treated body of the carbon nanotube composite assembled wire. For example, the width of the groove in the surface of the substrate is preferably 100 µm or more and 1000 µm or less, and the maximum depth of the groove from the surface of the substrate is preferably 50 µm or more and 500 µm or less.

In the third c step, examples of the method of removing the solvent from the carbon nanotube composite dispersion liquid include a method of vaporizing the solvent by natural vaporization or heating. When the solvent is vaporized by heating, it is preferable to set the heating temperature to be equal to or more than the boiling point of the solvent. Thereby, the carbon nanotube composite assembled wire can be obtained.

Fourth Embodiment: Method for Manufacturing Heat-Treated Body of Carbon Nanotube Composite Assembled Wire A method for manufacturing a heat-treated body of a carbon nanotube composite assembled wire in accordance with the present embodiment includes: a first step of preparing a plurality of carbon nanotubes; a second step of obtaining a plurality of carbon nanotube composites by coating each of the plurality of carbon nanotubes with an amorphous carbon-containing layer; a third step of obtaining a carbon nanotube composite assembled wire by assembling the plurality of carbon nanotube composites to be oriented in a longitudinal direction thereof; and a fourth step of obtaining a heat-treated body of the carbon nanotube composite assembled wire by removing the amorphous carbon-containing layer by heat-treating the carbon nanotube composite assembled wire.

(First Step, Second Step, and Third Step)

The first step, the second step, and the third step can respectively be the same as the first step, the second step, and the third step described in the third embodiment.

(Fourth Step)

In the fourth step, a heat-treated body of the carbon nanotube composite assembled wire is obtained by removing the amorphous carbon-containing layer by heat-treating the carbon nanotube composite assembled wire obtained in the third step.

As a result of earnest studies on a method for removing the amorphous carbon-containing layers from the carbon nanotube composite assembled wire, the present inventors have found that, by heat-treating the carbon nanotube composites under predetermined conditions, only the amorphous carbon-containing layers can be removed from the carbon nanotube composite assembled wire while maintaining the crystallinity of the carbon nanotubes, and thus a high crystallinity heat-treated body of the carbon nanotube composite assembled wire can be obtained.

Examples of the heat treatment include heat-treating the carbon nanotube composite assembled wire at a temperature of 400° C. or more and 800° C. or less under oxidizing conditions. Thereby, only the amorphous carbon-containing layers can be removed from the carbon nanotube composite assembled wire while maintaining the high crystallinity of the carbon nanotubes.

If the temperature of the heat treatment is less than 400° C., it is not possible to sufficiently remove the amorphous carbon-containing layers. On the other hand, if the temperature of the heat treatment exceeds 800° C., the carbon nanotubes may be burned and disappear. The temperature of the heat treatment is preferably 420° C. or more and 750° C. or less, more preferably 560° C. or more and 690° C. or less, and further preferably 550° C. or more and 650° C. or less.

The duration time of the heat treatment is changed as appropriate depending on the temperature of the heat treatment and the thickness of the amorphous carbon-containing layers. The time of the heat treatment is preferably 1 minute or more and 120 minutes or less, and further preferably 10 minutes or more and 60 minutes or less, for example.

The heat-treated body of the carbon nanotube composite assembled wire obtained in the fourth step preferably has a D/G ratio of 0.1 or less, the D/G ratio being the ratio of the peak intensity of the D band to the peak intensity of the G band in the Raman spectroscopic analysis with a wavelength of 532 nm. Thereby, the heat-treated body of the carbon nanotube composite assembled wire can have a high crystallinity. Therefore, the heat-treated body of the carbon nanotube composite assembled wire can have a high tensile strength and a high electrical conductivity. The D/G ratio is further preferably 0.01 or less. Although the lower limit value of the D/G ratio is not particularly limited, it can be 0.001 or more, for example.

When the carbon nanotube composite assembled wire obtained in the third step has a diameter of P1 and the heat-treated body of the carbon nanotube composite assembled wire obtained in the fourth step has a diameter of P2, P1 and P2 preferably exhibit a relation indicated by the following expression 1.

$$100 \leq P1/P2 \leq 10000 \qquad \text{expression 1}$$

In a case where P1 and P2 exhibit the relation indicated by the above expression 1, the case indicates that the amorphous carbon-containing layers are sufficiently removed from the carbon nanotube composite assembled wire, and a plurality of refined carbon nanotubes are in contact with each other or are aggregated in the heat-treated body of the carbon nanotube composite assembled wire. Thereby, the heat-treated body of the carbon nanotube composite assembled wire can have an excellent electrical conductivity. It should be noted that the manner that the plurality of refined CNTs are in contact with each other or are aggregated in the heat-treated body of the CNT composite assembled wire can be confirmed by directly observing the heat-treated body of the CNT composite assembled wire with a transmission electron microscope. In addition, in such a heat-treated body, it can be confirmed by an X-ray diffraction method that the CNT composite assembled wire is regularly aligned.

When the D/G ratio of each carbon nanotube prepared in the first step has a value of R1 and the D/G ratio of the heat-treated body of the carbon nanotube composite assembled wire obtained in the fourth step has a value of R2, R1 and R2 preferably exhibit a relation indicated by the following expression 2.

$$-0.2 \leq (R2-R1) \leq 0.2 \qquad \text{expression 2}$$

(in the above expression 2, R1 satisfies $0 \leq R1 \leq 0.2$ and R2 satisfies $0 \leq R2 \leq 0.2$)

In a case where R1 and R2 exhibit the relation indicated by the above expression 2, the case indicates that a high crystallinity heat-treated body of the carbon nanotube composite assembled wire is obtained by the fourth step without deteriorating the carbon nanotubes in the carbon nanotube composites.

R1 and R2 further preferably exhibit a relation indicated by the following expression 3 or 4.

$$-0.1 \leq (R2-R1) \leq 0.1 \qquad \text{expression 3}$$

(in the above expression 3, R1 satisfies $0 \leq R1 \leq 0.2$ and R2 satisfies $0 \leq R2 \leq 0.2$)

$$R1 = R2 \qquad \text{expression 4}$$

(in the above expression 4, R1 satisfies $0 \leq R1 \leq 0.2$ and R2 satisfies $0 \leq R2 \leq 0.2$).

EXAMPLES

The first to fourth embodiments will be described more specifically with reference to examples. However, the present embodiment is not limited by these examples.

<Sample 1>
(Preparation of Carbon Nanotube)

Carbon nanotubes were fabricated using carbon nanotube manufacturing apparatus 20 shown in FIG. 8. A quartz tube having an inner diameter of 20 mm was provided within a heating furnace, and a substrate having a width of 10 mm and a pure iron sheet (purity: 4N) with a square shape having a side length of 1 cm and a thickness of 10 μm as a disintegrable catalyst were placed within the quartz tube. Then, the temperature within the heating furnace was raised to 1000° C. while supplying argon gas having an argon gas concentration of 100 volume % into the quartz tube at a rate of 60 cc/min. Thereafter, in addition to the argon gas, methane gas was supplied for 15 seconds at a rate of 3000 cc/min, and then was continuously supplied for another one hour with the flow rate (rate) being changed to less than 3000 cc/min.

Due to the supply of the methane gas, the pure iron sheet disintegrated and released catalyst particles, and the catalyst particles having a particle diameter of 30 nm to 300 nm adhered onto the substrate. When the substrate was taken out of the quartz tube and was observed with a scanning electron microscope, carbon nanotubes were formed between some of the catalyst fine particles adhered onto the substrate so as to bridge between the particles.

For the obtained carbon nanotubes, diameters thereof were measured by Raman spectroscopic analysis, and lengths thereof were measured by observation with the scanning electron microscope. The carbon nanotubes had a diameter of 1 nm or more and 10 nm or less, and a length of 1 μm or more and 3 cm or less.

The structure of one carbon nanotube specified above was checked with a transmission electron microscope. It was confirmed that the carbon nanotube was a double-layer carbon nanotube having a linear-shaped overall external appearance, and included conical cone portions at both ends.

Raman spectroscopic analysis was performed on the above carbon nanotubes to obtain a Raman spectrum. The measurement conditions for the Raman spectroscopic analysis were as described in the first embodiment. When a D/G ratio was calculated from a peak intensity of a D band and a peak intensity of a G band in the Raman spectrum, the D/G ratio was 0.

(Fabrication of Carbon Nanotube Composite)

Next, the substrate having the above carbon nanotubes adhering thereto was placed within the quartz tube, and the temperature within the heating furnace was maintained at 1050° C. for 30 minutes while supplying methane gas having a methane gas concentration of 100 volume % into the quartz tube at a rate of 0.10 cm/sec to heat-treat the carbon nanotubes. Thereby, an amorphous carbon-containing layer was formed around each carbon nanotube to obtain a carbon nanotube composite.

The carbon nanotube composite obtained above was observed with the transmission electron microscope and an optical microscope to measure a diameter and a length thereof. The CNT composite had a diameter of 0.1 μm or more and 2 μm or less, and a length of 10 μm or more and 3 cm or less.

The structure of the above carbon nanotube composite was checked with the transmission electron microscope. As a result, it was confirmed that the carbon nanotube composite was fibrous and had a linear-shaped overall external appearance, and a layer containing amorphous carbon (amorphous carbon-containing layer) was formed on the surface of each carbon nanotube.

It was possible to pick up the carbon nanotube composite obtained above with tweezers and place it at a predetermined position under observation with the optical microscope. That is, the carbon nanotube composite had a good handling property.

Raman spectroscopic analysis was performed on the carbon nanotube composite obtained above to obtain a Raman spectrum. The measurement conditions for the Raman spectroscopic analysis were as described in the first embodiment. When a D/G ratio was calculated from a peak intensity of a D band and a peak intensity of a G band in the Raman spectrum, the D/G ratio was 0.7.

(Fabrication of Carbon Nanotube Composite Assembled Wire)

A carbon nanotube composite dispersion liquid was obtained by dispersing 100 μg of the carbon nanotube composites obtained above in 1 ml of 99.5% ethanol solution.

A quartz substrate including a groove formed in a surface thereof was prepared. The size of the groove was such that the width of the groove in the surface of the quartz substrate was 300 μm, the maximum depth of the groove from the surface of the quartz substrate was 200 μm, and the cross sectional shape perpendicular to a longitudinal direction of the groove was a semicircular shape.

By flowing the carbon nanotube composite dispersion liquid from one direction of the groove along the longitudinal direction of the groove, a longitudinal direction of a plurality of carbon nanotube composites in the carbon nanotube composite dispersion liquid was oriented along the longitudinal direction of the groove in the substrate.

When an obtained carbon nanotube composite assembled wire was observed with the optical microscope, it was confirmed that the plurality of carbon nanotube composites were oriented in a longitudinal direction of the carbon nanotube composite assembled wire.

The carbon nanotube composite assembled wire obtained above was observed with the optical microscope to measure a diameter and a length thereof. The CNT composite assembled wire had a diameter (P1) of 300 μm and a length of 10 mm.

Based on the above description, the CNT composite assembled wire of sample 1 corresponds to an example.

(Fabrication of Heat-Treated Body of Carbon Nanotube Composite Assembled Wire)

Next, the carbon nanotube composite assembled wire obtained above was heat-treated at a temperature of 650° C. for 60 minutes in the atmosphere to obtain a heat-treated body of the carbon nanotube composite assembled wire.

When the heat-treated body of the CNT composite assembled wire of sample 1 was checked with the scanning electron microscope, it was confirmed that a plurality of refined carbon nanotubes were assembled to be oriented in a longitudinal direction of the heat-treated body of the CNT composite assembled wire.

The heat-treated body of the CNT composite assembled wire of sample 1 was observed with the scanning electron microscope to measure a diameter thereof. The heat-treated body of the CNT composite assembled wire had a diameter (P2) of 50 nm.

When a value of P1/P2 was calculated from diameter P1 of the carbon nanotube composite assembled wire and diameter P2 of the heat-treated body of the carbon nanotube composite assembled wire, the value of P1/P2 was 6000.

Raman spectroscopic analysis was performed on the heat-treated body of the carbon nanotube composite assembled wire in the state placed on the quartz substrate to produce a Raman mapping image of a G band (see FIG. 6) and a Raman mapping image of a D band (see FIG. 7). The measurement conditions for the Raman spectroscopic analysis were as described in the first embodiment, and the method of producing each Raman mapping image was as described in the second embodiment.

It was able to be confirmed from the Raman mapping images shown in FIGS. 6 and 7 that the heat-treated body of the CNT composite assembled wire of sample 1 existed in the portions surrounded by the broken lines, and, in the heat-treated body of the CNT composite assembled wire, high crystallinity refined carbon nanotubes existed and the amorphous carbon-containing layers did not exist.

Raman spectroscopic analysis was performed on the obtained heat-treated body of the CNT composite assembled wire to obtain a Raman spectrum. The measurement conditions for the Raman spectroscopic analysis were as described in the first embodiment. When a D/G ratio was calculated from a peak intensity of the D band and a peak intensity of the G band in the Raman spectrum, the D/G ratio was 0.

Both a value (R1) of the D/G ratio of the carbon nanotube and a value (R2) of the D/G ratio of the heat-treated body of the CNT composite assembled wire were 0, that is, these values satisfied R1=R2.

Based on the above description, the heat-treated body of the CNT composite assembled wire of sample 1 corresponds to an example.

TABLE 1

| Sample No. | CNT Diameter (nm) | Length | D/G Ratio (R1) | Second Step Temperature (° C.) | Time (min) | CNT Composite Diameter (μm) | Length | D/G Ratio |
|---|---|---|---|---|---|---|---|---|
| 1 | 1 to 10 | 1 μm to 3 cm | 0 | 1050 | 30 | 0.1 to 2 | 10 μm to 3 cm | 0.7 |
| 2 | 1 to 10 | 1 μm to 3 cm | 0 | 1050 | 30 | 0. to 2 | 10 μm to 3 cm | 0.7 |
| 3 | 1 to 10 | 1 μm to 3 cm | 0 | 1050 | 30 | 0.1 to 2 | 10 μm to 3 cm | 0.7 |
| 4 | 1 to 10 | 1 μm to 3 cm | 0 | 1050 | 30 | 0.1 to 2 | 10 μm to 3 cm | 0.7 |

| Sample No. | CNT Composite Handling Property | CNT Composite Assembled Wire Diameter P1 (μm) | Length (mm) | Fourth Step Conditions | Heat-Treated Body of CNT Composite Assembled Wire Diameter P2 (μm) | D/G Ratio (R2) | (R2 − R1) | P1/P2 |
|---|---|---|---|---|---|---|---|---|
| 1 | good | 300 | 10 | 650° C./60 min | 0.05 | 0 | 0 | 6000 |
| 2 | good | 300 | 10 | 500° C./60 min | 300 | 0.7 | 0.7 | 1 |
| 3 | good | 300 | 10 | 550° C./60 min | 300 | 0.7 | 0.7 | 1 |
| 4 | good | 300 | 10 | 700° C./60 min | unable to be fabricated (CNT disappeared) | — | — | |

<Samples 2 to 4>

In each of samples 2 to 4, carbon nanotubes were fabricated by the same method as that for sample 1. For the obtained carbon nanotubes, diameters, lengths, and a D/G ratio (R1) thereof were measured by the same methods as those for sample 1. The results are shown in the columns "diameter", "length", and "D/G ratio (R1)" of the column "CNT" in Table 1.

Heat treatment was performed on each obtained carbon nanotube in a hydrocarbon-based gas by the same method as that for sample 1 to obtain a carbon nanotube composite. The temperature and the time of the heat treatment are shown in the columns "temperature" and "time" of the column "second step" in Table 1.

For the obtained carbon nanotube composite, a diameter, a length, and a D/G ratio thereof were measured by the same methods as those for sample 1. The results are shown in the columns "diameter", "length", and "D/G ratio" of the column "CNT composite" in Table 1.

The structure of the carbon nanotube composite of each of samples 2 to 4 was checked with the transmission electron microscope. As a result, it was confirmed that each carbon nanotube composite was fibrous and had a linear-shaped overall external appearance, and a layer containing amorphous carbon (amorphous carbon-containing layer) was formed on the surface of one carbon nanotube.

It was possible to pick up the carbon nanotube composite of each of samples 2 to 4 with tweezers and place it at a predetermined position under observation with the optical microscope. That is, each carbon nanotube composite had a good handling property.

Next, a carbon nanotube composite assembled wire was fabricated by the same method as that for sample 1, using the carbon nanotube composite of each of samples 2 to 4.

When the carbon nanotube composite assembled wire of each of samples 2 to 4 was observed with the optical microscope, it was confirmed that a plurality of carbon nanotube composites were oriented in a longitudinal direction of the carbon nanotube composite assembled wire.

For the carbon nanotube composite assembled wire of each of samples 2 to 4, diameter P1 and a length thereof were measured by the same methods as those for sample 1. The results are shown in the columns "diameter P1" and "length" of the column "CNT composite assembled wire" in Table 1. Based on these results, the CNT composite assembled wire of each of samples 2 to 4 corresponds to an example.

Next, the carbon nanotube composite assembled wire of each of samples 2 to 4 was heat-treated in the atmosphere. The temperature and the time of the heat treatment are shown in the columns "temperature" and "time" of the column "fourth step" in Table 1.

When sample 2 was observed with the transmission electron microscope after the heat treatment, there was no change in the carbon nanotube composite assembled wire, and the amorphous carbon-containing layers were confirmed on the surfaces of the carbon nanotubes. Thus, it was confirmed that, under the heat treatment conditions for sample 2, it is not possible to remove the amorphous carbon-containing layers. The reason why it is not possible to remove the amorphous carbon-containing layers may be that the heat treatment time is short.

When sample 3 was observed with the transmission electron microscope after the heat treatment, the amorphous carbon-containing layers were confirmed on the surfaces of the carbon nanotubes, but the amount of the amorphous carbon-containing layers decreased. Thus, it was confirmed that, under the heat treatment conditions for sample 3, it is not possible to sufficiently remove the amorphous carbon-containing layers. The reason why it is not possible to sufficiently remove the amorphous carbon-containing layers may be that the heat treatment time is short.

When sample 4 was observed with the transmission electron microscope after the heat treatment, neither the carbon nanotubes nor the amorphous carbon-containing layers were able to be observed. Thus, it was confirmed that, under the heat treatment conditions for sample 4, the carbon nanotubes also disappear together with the amorphous carbon-containing layers. The reason why the carbon nanotubes disappear together with the amorphous carbon-containing layers may be that the heat treatment time is long.

For the heat-treated body of the carbon nanotube composite assembled wire of each of samples 2 and 3, a diameter and a D/G ratio (R2) thereof were measured by the same methods as those for sample 1. Further, values of (R2−R1) and P1/P2 were calculated. The results are shown in the columns "diameter P2" and "D/G ratio" of the column "heat-treated body of CNT composite assembled wire" and the columns "(R2−R1)" and "P1/P2" in Table 1.

Although the embodiments and the examples of the present disclosure have been described above, it is also originally intended to combine or variously modify the features of the embodiments and the examples as appropriate.

It should be understood that the embodiments and the examples disclosed herein are illustrative and non-restrictive in every respect. The scope of the present invention is defined by the scope of the claims, rather than the embodiments and the examples described above, and is intended to include any modifications within the scope and meaning equivalent to the scope of the claims.

REFERENCE SIGNS LIST

1: carbon nanotube composite; 2: carbon nanotube; 3: amorphous carbon; 10: carbon nanotube composite assembled wire; 20: carbon nanotube; 21: reaction chamber; 22: gas supplying mechanism; 23: catalyst supplying mechanism; 24: substrate holding mechanism; 25: entrance zone; 26: formation zone; 27: heater; 28: gas cylinder; 29: flow control valve; C: cone portion; D: disintegrable catalyst; P: catalyst particle.

The invention claimed is:

1. A carbon nanotube composite assembled wire comprising a plurality of carbon nanotube composites,
  each of the plurality of carbon nanotube composites including one carbon nanotube and an amorphous carbon-containing layer that coats the carbon nanotube,
  the carbon nanotube having a D/G ratio of 0.1 or less, the D/G ratio being a ratio of a peak intensity of a D band to a peak intensity of a G band in Raman spectroscopic analysis with a wavelength of 532 nm,
  each of the plurality of carbon nanotube composites being fibrous and having a diameter of 0.1 µm or more and 50 µm or less,
  the plurality of carbon nanotube composites being oriented in a longitudinal direction of the carbon nanotube composite assembled wire.

2. The carbon nanotube composite assembled wire according to claim 1, wherein the D/G ratio of the amorphous carbon-containing layer is 0.5 or more.

3. A heat-treated body of the carbon nanotube composite assembled wire according to claim 1.

4. The heat-treated body of the carbon nanotube composite assembled wire according to claim 3, wherein the carbon nanotube composite assembled wire has a diameter of P1 and the heat-treated body of the carbon nanotube composite assembled wire has a diameter of P2, the P1 and the P2 satisfying the expression 100≤P1/P2≤10000.

5. The heat-treated body of the carbon nanotube composite assembled wire according to claim 3, wherein the D/G ratio of the heat-treated body of the carbon nanotube composite assembled wire is 0.1 or less.

6. The heat-treated body of the carbon nanotube composite assembled wire according to claim 3, wherein in the heat-treated body of the carbon nanotube composite assembled wire, the amorphous carbon-containing layer is removed.

7. A method for manufacturing a carbon nanotube composite assembled wire, the method comprising:
  a first step of preparing a plurality of carbon nanotubes, wherein the carbon nanotubes have a D/G ratio of 0.1 or less, the D/G ratio being a ratio of a peak intensity of a D band to a peak intensity of a G band in Raman spectroscopic analysis with a wavelength of 532 nm;
  a second step of obtaining a plurality of carbon nanotube composites by coating each of the plurality of carbon nanotubes with an amorphous carbon-containing layer, wherein each of the plurality of carbon nanotube composites is fibrous and has a diameter of 0.1 µm or more and 50 µm or less; and
  a third step of obtaining the carbon nanotube composite assembled wire by assembling the plurality of carbon nanotube composites so as to be oriented in a longitudinal direction thereof.

8. The method for manufacturing the carbon nanotube composite assembled wire according to claim 7, wherein the second step includes heat-treating the plurality of carbon nanotubes at a temperature of 950° C. or more and 1100° C. or less in a hydrocarbon-based gas.

9. The method for manufacturing the carbon nanotube composite assembled wire according to claim 7, wherein the third step includes
  a third a step of obtaining a carbon nanotube composite dispersion liquid by dispersing the plurality of carbon nanotube composites in a solvent,
  a third b step of orienting the plurality of carbon nanotube composites in the longitudinal direction by flowing the carbon nanotube composite dispersion liquid in the longitudinal direction, and
  a third c step of obtaining the carbon nanotube composite assembled wire by removing the solvent from the carbon nanotube composite dispersion liquid after the third b step.

10. A method for manufacturing a heat-treated body of a carbon nanotube composite assembled wire, the method comprising:
  a first step of preparing a plurality of carbon nanotubes, wherein the carbon nanotubes have a D/G ratio of 0.1 or less, the D/G ratio being a ratio of a peak intensity of a D band to a peak intensity of a G band in Raman spectroscopic analysis with a wavelength of 532 nm;
  a second step of obtaining a plurality of carbon nanotube composites by coating each of the plurality of carbon nanotubes with an amorphous carbon-containing layer, wherein each of the plurality of carbon nanotube composites is fibrous and has a diameter of 0.1 µm or more and 50 µm or less;
  a third step of obtaining a carbon nanotube composite assembled wire by assembling the plurality of carbon nanotube composites so as to be oriented in a longitudinal direction thereof; and a fourth step of obtaining the heat-treated body of the carbon nanotube composite assembled wire by removing the amorphous carbon-containing layer by heat-treating the carbon nanotube composite assembled wire.

11. The method for manufacturing the heat-treated body of the carbon nanotube composite assembled wire according to claim 10, wherein
the carbon nanotube composite assembled wire has a diameter of P1 and the heat-treated body of the carbon nanotube composite assembled wire has a diameter of P2, the P1 and the P2 satisfying the expression:

$$100 \leq P1/P2 \leq 10000.$$

12. The method for manufacturing the heat-treated body of the carbon nanotube composite assembled wire according to claim 10, wherein the second step includes heat-treating the plurality of carbon nanotubes at a temperature of 950° C. or more and 1100° C. or less in a hydrocarbon-based gas.

13. The method for manufacturing the heat-treated body of the carbon nanotube composite assembled wire according to claim 10, wherein the third step includes a third a step of obtaining a carbon nanotube composite dispersion liquid by dispersing the plurality of carbon nanotube composites in a solvent, a third b step of orienting the plurality of carbon nanotube composites in the longitudinal direction by flowing the carbon nanotube composite dispersion liquid in the longitudinal direction, and a third c step of obtaining the carbon nanotube composite assembled wire by removing the solvent from the carbon nanotube composite dispersion liquid after the third b step.

14. The method for manufacturing the heat-treated body of the carbon nanotube composite assembled wire according to claim 10, wherein heat treatment in the fourth step includes heat-treating the carbon nanotube composite assembled wire at a temperature of 400° C. or more and 800° C. or less under oxidizing conditions.

15. The method for manufacturing the heat-treated body of the carbon nanotube composite assembled wire according to claim 14, wherein the heat treatment in the fourth step includes heat-treating the carbon nanotube composite assembled wire at a temperature of 560° C. or more and 690° C. or less under the oxidizing conditions.

* * * * *